US011150332B1

(12) United States Patent
Chen et al.

(10) Patent No.: US 11,150,332 B1
(45) Date of Patent: Oct. 19, 2021

(54) SELF-CALIBRATING OPTICAL TRANSCEIVER SYSTEM WITH REDUCED CROSSTALK SENSITIVITY FOR THROUGH-DISPLAY PROXIMITY SENSING

(71) Applicant: Apple Inc., Cupertino, CA (US)

(72) Inventors: Tong Chen, Cupertino, CA (US); Dong Zheng, Los Altos, CA (US); Mark T. Winkler, San Jose, CA (US); Stephen N. Sweet, San Jose, CA (US); Tsu-Hui Lin, San Jose, CA (US); Wenrui Cai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/917,891

(22) Filed: Jun. 30, 2020

(51) Int. Cl.
| | |
|---|---|
| *G01S 7/497* | (2006.01) |
| *H04B 10/40* | (2013.01) |
| *G01K 13/00* | (2021.01) |
| *G01S 17/08* | (2006.01) |
| *G06F 3/044* | (2006.01) |

(52) U.S. Cl.
CPC .............. *G01S 7/497* (2013.01); *G01K 13/00* (2013.01); *G01S 17/08* (2013.01); *H04B 10/40* (2013.01); *G06F 3/044* (2013.01)

(58) Field of Classification Search
CPC ......... G01S 7/497; G01S 17/08; G01K 13/00; H04B 10/40; G06F 3/044
See application file for complete search history.

(56) References Cited

U.S. PATENT DOCUMENTS

| | | | |
|---|---|---|---|
| 4,254,333 A | | 3/1981 | Bergström |
| 4,468,131 A | | 8/1984 | Bui et al. |
| 6,233,045 B1 | | 5/2001 | Suni et al. |
| 6,816,523 B1 | | 11/2004 | Glenn et al. |
| 6,872,931 B2 | | 3/2005 | Liess et al. |
| 7,277,180 B2 | | 10/2007 | Townley-Smith et al. |
| 7,339,727 B1 | * | 3/2008 | Rothenberg ........ H01S 3/06791 359/349 |
| 7,388,672 B2 | | 6/2008 | Zhou et al. |
| (Continued) | | | |

FOREIGN PATENT DOCUMENTS

| | | |
|---|---|---|
| CN | 102109650 | 6/2011 |
| CN | 108225543 | 6/2018 |
| (Continued) | | |

OTHER PUBLICATIONS

U.S. Appl. No. 16/230,967, filed Dec. 21, 2018, Huang et al.
(Continued)

*Primary Examiner* — Seung C Sohn
(74) *Attorney, Agent, or Firm* — Brownstein Hyatt Farber Schreck, LLP

(57) ABSTRACT

An optical sensing system includes a transmitter side and a receiver side, and is configured to be positioned below a display of an electronic device. The transmitter side includes a light emitter, a temperature sensor, and a photodiode. The receiver side includes a photodiode and a temperature sensor. The optical sensing system includes an application-specific integrated circuit that leverages the temperature sensors, the photodiodes, and one or more signal filters such as a high-pass filter to perform multiple field calibrations of the optical sensing system, thereby improving accuracy and precision thereof.

20 Claims, 9 Drawing Sheets

(56) References Cited

U.S. PATENT DOCUMENTS

| | | |
|---|---|---|
| 7,509,050 B2 | 3/2009 | Ekkizogloy et al. |
| 7,620,332 B2 | 11/2009 | Nishiyama |
| 7,675,020 B2 | 3/2010 | Machida |
| 7,995,193 B2 | 8/2011 | Kuwata |
| 8,208,814 B2 | 6/2012 | Sheth et al. |
| 8,529,460 B2 | 9/2013 | Kawano et al. |
| 8,736,581 B2 | 5/2014 | Han et al. |
| 8,896,745 B2 | 11/2014 | Takachi |
| 8,942,069 B2 | 1/2015 | Tortora |
| 9,004,698 B2 | 4/2015 | Kilcher et al. |
| 9,091,573 B2 | 7/2015 | Van Der Lee et al. |
| 9,648,221 B2 | 5/2017 | Seo et al. |
| 9,912,923 B2 | 3/2018 | Kilcher et al. |
| 10,184,783 B2 | 1/2019 | Flanders et al. |
| 10,215,555 B2 | 2/2019 | Chen et al. |
| 10,317,651 B2 | 6/2019 | Furutake et al. |
| 10,379,028 B2 | 8/2019 | Spruit et al. |
| 10,386,554 B2 | 8/2019 | Hjelmstrom et al. |
| 10,492,679 B2 | 12/2019 | Zhou |
| 10,503,048 B2 | 12/2019 | Del Bino et al. |
| 10,527,589 B2 * | 1/2020 | Kolb ............... G01N 29/2418 |
| 10,555,079 B2 | 2/2020 | Bakish |
| 10,613,625 B2 | 4/2020 | Huang et al. |
| 10,581,474 B1 | 6/2020 | Fishman et al. |
| 10,791,283 B2 | 9/2020 | Bardagjy et al. |
| 10,845,873 B2 | 11/2020 | Huang |
| 2005/0156874 A1 | 7/2005 | Kong |
| 2009/0002829 A1 | 1/2009 | Shinohara |
| 2011/0126617 A1 | 6/2011 | Apezteguia et al. |
| 2011/0267467 A1 | 11/2011 | Kimura et al. |
| 2012/0281221 A1 | 11/2012 | Studer et al. |
| 2014/0293055 A1 | 10/2014 | Otsuka |
| 2016/0021285 A1 | 1/2016 | Nadler et al. |
| 2017/0090599 A1 | 3/2017 | Kuboyama et al. |
| 2017/0192133 A1 | 7/2017 | Murakami et al. |
| 2017/0351049 A1 | 12/2017 | Yong et al. |
| 2017/0374261 A1 | 12/2017 | Teich et al. |
| 2018/0081434 A1 | 3/2018 | Siddiqui et al. |
| 2019/0317454 A1 | 10/2019 | Holenarsipur et al. |
| 2019/0391539 A1 | 12/2019 | Perkins et al. |
| 2020/0072740 A1 | 3/2020 | Venturini et al. |
| 2020/0103274 A1 | 4/2020 | Garrett et al. |
| 2020/0200522 A1 | 6/2020 | Huang et al. |
| 2020/0309661 A1 | 10/2020 | Spruit et al. |
| 2020/0356159 A1 | 11/2020 | Mutlu et al. |
| 2020/0370879 A1 | 11/2020 | Mutlu et al. |
| 2021/0015350 A1 | 1/2021 | Butte et al. |

FOREIGN PATENT DOCUMENTS

| | | |
|---|---|---|
| WO | WO 05/013517 | 2/2005 |
| WO | WO 09/156937 | 12/2009 |
| WO | WO 17/178711 | 10/2017 |
| WO | WO 18/036685 | 3/2018 |
| WO | WO 19/042953 | 3/2019 |

OTHER PUBLICATIONS

U.S. Appl. No. 16/408,295, filed May 9, 2019, Mutlu et al.
U.S. Appl. No. 16/418,295, filed May 21, 2019, Chen et al.
U.S. Appl. No. 16/773,827, filed Jan. 27, 2020, Mutlu et al.
U.S. Appl. No. 16/827,646, filed Mar. 23, 2020, Li et al.
U.S. Appl. No. 16/849,826, filed Apr. 15, 2020, Mutlu et al.
U.S. Appl. No. 17/124,132, filed Dec. 16, 2020, Chen et al.
U.S. Appl. No. 17/617,218, filed Feb. 4, 2021, Shou et al.

\* cited by examiner

SELF-CALIBRATING OPTICAL TRANSCEIVER SYSTEM WITH REDUCED CROSSTALK SENSITIVITY FOR THROUGH-DISPLAY PROXIMITY SENSING

TECHNICAL FIELD

Embodiments described herein relate to proximity sensing systems for portable electronic devices and, in particular, to optical transceiver systems for object proximity sensing through an electronic device display that self-calibrate in real-time to mitigate against crosstalk and signal drift interference effects.

BACKGROUND

An electronic device can include an infrared proximity sensor. Typically, a proximity sensor is a reflective infrared sensor that emits a signal in infrared light and monitors for reflections of that light to determine whether an object, such as a user, is within a threshold distance of the electronic device. In many conventional constructions, some light emitted by the proximity sensor is reflected by portions of the electronic device itself (e.g., cover glass, housing layers, and so on), causing interference with the signal typically referred to as "crosstalk." In addition, as a user grasps the device, and/or transports it from place to place, temperature(s) within a proximity sensor can rapidly change by several tens of degrees, causing interference to the signal typically referred to as "signal drift." Signal drift and/or crosstalk can also be caused by self-heating or self-cooling of a conventional proximity sensor when in operation.

Signal drift and crosstalk substantially reduce both accuracy and precision of conventional proximity sensors, often causing an electronic device leveraging such sensors to exhibit behavior(s) such as: enabling or disabling a capacitive touch screen at unexpected times; dimming or brightening a display at unexpected times; increasing or decreasing speaker volume at unexpected times; and so on.

SUMMARY

Embodiments described herein take the form of an electronic device including at least an optical transceiver system for detecting proximity of an object external to the electronic device. The optical transceiver system includes a light emitter. The light emitter is configured to emit light toward the object to illuminate the object. The optical transceiver system also includes a first photosensor and a second photosensor optically isolated from the first photosensor and the light emitter. The first photosensor is configured to receive light emitted from the light emitter and the second photosensor is configured to receive light reflected from the object. In addition, the optical transceiver system includes a first temperature sensor thermally coupled to the light emitter and a second temperature sensor thermally coupled to the second photosensor.

The optical transceiver system further includes a processor configured to apply multiple calibrations, in many embodiments in real-time, to input(s) and/or output(s) of various elements of the optical transceiver system. In particular, the processor in many embodiments is configured to apply (1) a first field calibration by adjusting power output from the light emitter based on an output from the first photosensor, (2) a second field calibration by adjusting power output of the second photosensor based on at least one sensor output of the first temperature sensor or the second temperature sensor, and (3) a third field calibration of the optical transceiver system by filtering output of the second photosensor with a high-pass filter.

Related and additional embodiments of an electronic device including an optical transceiver system include a housing defining an interior cavity. In addition, such embodiments include a display within the interior cavity of the housing. In these examples, the optical transceiver system may be positioned within the interior cavity adjacent to the display. For example, the optical transceiver system may be positioned within a bezel region surrounding an active display area of the display, may be positioned below an active display area of the display, may be positioned within or along a sidewall or housing portion supporting the display, and so on.

For example, in some embodiments, the display defines an active display area and the optical transceiver system is positioned below the active display area. In these examples, the light emitter is configured to emit light through the active display area of the display and the second photosensor is configured to receive light reflected from the object that has traversed through the active display area. These example embodiments are often referred to as "through-display" embodiments.

Related and additional embodiments may include a configuration in which the optical transceiver system includes a module enclosure defining a first barrel enclosing the light emitter and the first photosensor, and a second barrel enclosing the second photosensor and optically isolated from the first barrel. The module enclosure can be formed from an optically transparent material or, more specifically, a material transparent to a band of light emitted by the light emitter. In some cases, the processor may also be disposed within and/or coupled to the module enclosure.

In many embodiments, the first barrel encloses the first temperature sensor and the second barrel encloses the second temperature sensor. In this manner, the first temperature sensor is thermally coupled to the light emitter and the first photosensor and the second temperature sensor is thermally coupled to the second photosensor. In some embodiments, a thermal bulk material may be used the thermally couple the light emitter to the second photosensor such that the temperature of the two elements of the optical transceiver system operate at substantially the same temperature, although this is not required of all embodiments.

In some examples, the first barrel may be capped by a first lens, and the second barrel may be capped by a second lens. In further embodiments, filter elements or other optical elements may be used, such as infrared cut filters, color filters, polarization filters, and the like. Some embodiments implement active lens elements (e.g., movable lenses) whereas others implement passive lens elements. Lenses may take any suitable shape or configuration; in many embodiments, Fresnel lenses may be selected for their compact size. In some embodiments, lenses capping the first barrel and/or the second barrel of the module enclosure may be oriented, tilted, or otherwise configured to direct incident light along a particular direction or focal point (e.g., active and/or passive lenses can be used for beamforming). In some examples, arrays of microlenses or other micro optics can be used.

Related and additional embodiments may include at least a digital-to-analog converter configured to convert a first digital value into a first analog signal (e.g., current signal) driving the light emitter, and an analog to digital converter configured to convert a second analog signal output from the second photosensor into a second digital value. In these examples, the first field calibration includes a first digital adjustment to the first digital value, the second field calibration includes a second digital adjustment to the second digital value, and the third field calibration includes a third digital adjustment to the second digital value. In a broader, non-limiting phrasing, in certain embodiments, the field calibration(s) performed by the processor may be digital field calibrations. This construction may not be required of all embodiments; in other examples, a field calibration as described herein can be an analog-domain calibration. In some cases, field calibrations can access one or more lookup tables to obtain digital values used to bias, adjust, or otherwise modify a digital-domain value. In many embodiments, the lookup tables can be stored in a memory. For example, certain related and additional embodiments may include a configuration in which the optical transceiver system includes an application-specific integrated circuit including (1) the processor and (2) a memory operably coupled to the processor, and the first lookup table, the second lookup table, and the third lookup table are stored in the memory of the application-specific integrated circuit. In other constructions, computation work associated with calibrating an optical transceiver system, as described herein, can be performed in whole or in part by an application-specific integrated circuit, by two or more application-specific integrated circuits (e.g., a dedicated application-specific integrated circuit to each field calibration operation), and/or by cooperation with a processor of an electronic device incorporating the optical transceiver system (e.g., an application-specific integrated circuit may provide general purpose input/output and a processor or coprocessor of the electronic device may provide computational resources to determine one or more field calibrations).

Other embodiments described herein take the form of an optical proximity sensor system for determining proximity of an object to an external surface of a portable electronic device. The optical proximity sensor system includes an enclosure defining a transmitter-side barrel and a receiver-side barrel. The transmitter-side barrel encloses a transmitter module and the receiver-side barrel encloses a receiver module.

The transmitter module of these embodiments includes a digital to analog converter configured to receive a first digital value and to output a current in proportion to the first digital value. The transmitter module also includes a light-emitting element (e.g., VCSEL, laser diode, light-emitting diode, and so on) configured to receive the current and, in response, to emit light out of the transmitter-side barrel. In other cases, an array of light-emitting elements may be used.

The transmitter-side barrel also includes a photodetector module (which can include a single photodetector or an array of photodetectors) configured to receive light emitted from the light-emitting element and, in response, output a second digital value (and/or a sequence of digital values) used to bias the first digital value to control power output from the light-emitting element, wavelength output from the light-emitting element, or bandwidth output from the light-emitting element.

In other cases, separate photodetector modules may not be required. For example, the transmitter-side barrel can include one or more light-emitting elements configured for self-mixing operation. In other cases, intra-cavity photodiodes may be leveraged to receive light output from one or more light-emitting elements.

The transmitter-side barrel also includes a temperature sensor thermally coupled to the light-emitting element and configured to output a temperature value (and/or a sequence of temperature values) used to bias the first digital value to control power output from the light-emitting element, wavelength output from the light-emitting element, or bandwidth output from the light-emitting element. In yet other embodiments, a temperature of the light-emitting element can be derived from an optical property of the light-emitting element (e.g., a property detected by a photodetector).

In these embodiments, the receiver module (within the receiver-side barrel) is configured to receive light reflected from the object and, in response, output a third digital value corresponding to proximity of the object to the external surface. In a more general and non-limiting phrasing, the receiver module is configured to receive light reflected from the object (that light having been emitted by the light emitter of the transmitter module) and to output a digital value corresponding to a magnitude of light received; the closer the object to the electronic device, the higher an electrical power output from the receiver module may be.

Related and additional embodiments may include a configuration in which the receiver module includes an analog front end and an analog to digital converter. The analog front end can include a photosensor configured to receive light reflected from the object. The analog to digital converter can be operably coupled to the photosensor and configured to output the third digital value, and a second temperature sensor thermally coupled to the photosensor and configured to output a second temperature value used to bias the third digital value. Related and additional embodiments may include a configuration in which the receiver module includes a high-pass frequency filter applied to the third digital value.

Embodiments described herein take the form of a method of operating an optical proximity sensor system for a portable electronic device, the method operations such as: driving a light-emitting element with a current defined by a digital drive current value; sampling a first temperature sensor thermally coupled to the light-emitting element to obtain a first temperature value; biasing the digital drive current value based on the first temperature value; sampling a first light sensor optically coupled to the light-emitting element to obtain a first light value; biasing the digital drive current value based on the first light value; sampling a second light sensor optically isolated from the light-emitting element to obtain a second light value; sampling a second temperature sensor thermally coupled to the second light sensor to obtain a second temperature value; biasing the second light value based on the second temperature value; and providing, as output, the biased second light value.

Related and additional embodiments may further include operations such as: querying a first lookup table with the first temperature value to obtain a first thermal calibration value; biasing the digital drive current value based on the first thermal calibration value; querying a second lookup table with the first light value to obtain a first light calibration value; biasing the digital drive current value based on the first light calibration value; querying a third lookup table with the second light value to obtain a second light calibration value; one, or both, of (1) biasing the digital drive current value based on the second light calibration value, or (2) biasing the second light value based on the second light calibration value; querying a third lookup table with the second temperature value to obtain a second thermal calibration value; and biasing the second light value based on the second light calibration value.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
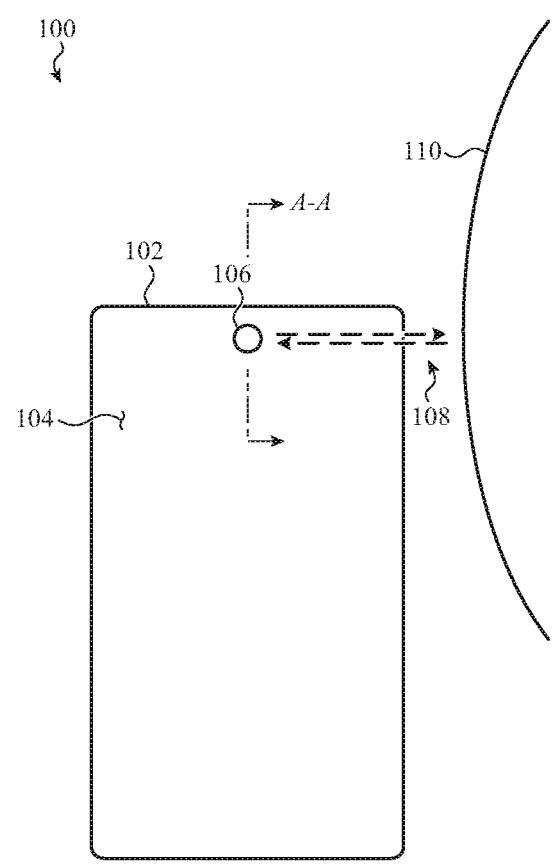
FIG. 1 depicts an electronic device incorporating an optical sensing system to detect proximity of an object, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Certain accompanying figures include vectors, rays, traces, and/or other visual representations of one or more example paths—which may include reflections, refractions, diffractions, and so on, through one or more mediums—that may be taken by, or may be presented to represent, one or more photons, wavelets, or other propagating electromagnetic energy originating from, or generated by, one or more light sources shown or, or in some cases, omitted from, the accompanying figures. It is understood that these simplified visual representations of light or, more generally, electromagnetic energy, regardless of spectrum (e.g., ultraviolet, visible light, infrared, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an optical sensing system disposed below a display of an electronic device. The optical sensing system is configured to self-calibrate in the field (herein a "field calibration") to mitigate interference effects, such as signal drift, other signal drift, and crosstalk. In particular, multiple simultaneous or sequential real-time calibration operations are performed to dramatically improve both accuracy and precision of the optical sensing system.

In many examples, the optical imaging system is configured for use as a proximity sensor for a mobile or portable electronic device, but this is merely one example. It may be appreciated that any suitable optical sensing or imaging system can utilize the techniques and architectures described herein to receive and/or emit light. Examples include, but are not limited to: light meters; light color sensors; proximity sensors; dot projectors; rangefinders; infrared image capture systems; ultraviolet image capture systems; direct time-of-flight depth sensors; indirect time-of-flight depth sensors; and so on.

For example, some embodiments reference an electronic device that includes a display, such as a micro-scale light emitting diode display ("microLED") or an organic light emitting diode display ("OLED"). These example electronic devices can further include an optical sensing system configured to operate as a reflective optical sensor that illuminates a field of view and monitors for reflections of emitted light within that field of view to infer that an optically reflective object, such as a user of the electronic device, is present within the field of view.

In typical embodiments, an optical sensing system is configured to operate in the infrared wavelength band and is positioned on or coupled to a rear surface of, and/or integrated within, an active display area of the display of the electronic device. More specifically, as used herein the phrase "rear surface" of an active display area of a display refers to a surface of a display opposite a surface from which light is emitted by that display, which is referred to herein as the "front surface" of the display.

In this manner, and as a result of this construction, an optical sensing system can illuminate objects that are nearby the display, such as a user. As may be appreciated by a person of skill in the art, objects proximate to the display reflect some of the light emitted by the optical sensing system. A portion of the object-reflected light is directed back toward the display and can be captured by the optical sensing system, positioned behind the display. The received light can be quantified and/or digitized and thereafter consumed by the electronic device to perform or inform some task. The electronic device can utilize information received from the optical sensing system to perform any suitable task or operation or sets thereof. Examples include, but are not limited to: disabling or reducing a brightness of a display of the electronic device in response to receiving information from the optical sensing system that an object is closer than a threshold distance to the electronic device; enabling or increasing a brightness of a display of the electronic device in response to receiving information from the optical sensing system that an object is farther than a threshold distance to the electronic device; enabling or disabling a touch or force input system of the electronic device in response to receiving information from the optical sensing system that an object is nearby (e.g., a distance satisfying a threshold or within a threshold range) the electronic device; and so on.

In this manner, more generally and broadly, embodiments described herein facilitate through-display detection (and/or imaging) of an object nearby the front surface of a display of an electronic device.

In many embodiments, an optical sensing system includes a module enclosure divided into two portions, referred to herein as a transmitter side and a receiver side. The transmitter side and the receiver side are each defined by a respective one barrel defining a respective imaging aperture at one end. Within the transmitter side barrel, or more simply the transmitter barrel, is disposed a light-emitting element. In one example, the light-emitting element is a vertical-cavity surface-emitting laser ("VCSEL") or an array thereof. In other examples, a light-emitting diode, an edge-emitting laser, a horizontal cavity surface-emitting laser, resonant cavity light-emitting diode, superluminous diodes, and so on (or arrays thereof) may be used. The light-emitting element is configured to receive an electrical current (e.g., from a digital-to-analog converter) and, in response, to emit light at a particular wavelength, at a particular bandwidth, and/or at a particular power (e.g., brightness).

The receiver side barrel encloses a photosensor, also referred to as a "photosensitive element." An example of a photosensor is a photodiode configured to generate a current proportional to intensity or integrated radiant flux of light illuminating the photodiode. In other cases, other photosensitive elements can be used.

The receiver barrel and the transmitter barrel are optically isolated from one another such that, when the light-emitting element is driven with a current, light emitted from that element exits the module enclosure through the transmitter side imaging aperture and does not directly illuminate the photosensor of the receiver barrel.

As noted above, in typical constructions, the module enclosure of the optical sensing system is coupled to a rear surface of a display, positioned below an active display area of that display. As a result of this construction, light emitted from the light-emitting element on the transmitter side of the optical sensing system can pass through inter-pixel regions of the active display area to exit the electronic device and illuminate one or more objects external to the electronic device. If an object is present, such as a user, at least a portion of the light emitted by the light-emitting element will be reflected and will traverse through inter-pixel regions of the display to enter the imaging aperture of the receiver side to illuminate the photosensitive element. In this manner, current output from the photosensitive element can be used to infer whether an object is nearby the electronic device; the higher the current, the higher the likelihood that an object is proximate to the electronic device.

However, as noted above, signal and crosstalk interferences can occur. In particular, as a user of a portable electronic device incorporating an optical sensing system such as described herein holds that device in the user's hand, ambient temperature and/or a user's body heat (in addition to self-heating or self-cooling of the portable electronic device and/or optical sensing system) may either heat or cool the electronic device and, by extension, the optical sensing system. This change in temperature may affect one or more operational characteristics of the light-emitting element or the photosensitive element. For example, the light-emitting element when stimulated or driven by the same drive current may emit light at a slightly different wavelength or divergence. In other cases, brightness or intensity of the light emitted from the light-emitting element may increase or decrease. This change in light output by the light-emitting element may be received at the photosensitive element and may be interpreted as a change induced by an object. More particularly, the electronic device may interpret that a user has moved away from or closer to the electronic device. In some cases, the change in light received by the photosensitive element can cause the electronic device to incorrectly determine that a user is no longer present.

Phrased in another manner, signal output from a receive side of an optical sensing system can drift over time due to one or more sources of interference and/or one or more crosstalk aggressors. For example, thermal changes can mechanically change one or more physical properties and/or electrical properties of one or more elements of the electronic device or the optical sensing system. For example, as temperature increases, layers of material through which light is emitted may physically change in dimension in a manner that, in turn, changes an optical property thereof. The change in the optical property can, in turn, change one or more characteristics of crosstalk reflecting from those layers of material. In other cases, thermal effects or changes can mechanically change one or more properties of a light-emitting element and/or a light-receiving element. In some cases, these changes may be proportional to one another, identical, or independent. In still other examples, thermal effects or other mechanical changes or effects (e.g., wear or setting of an electronic device when in use) can change one or more electrical properties that, in turn, change a characteristic of light emitted from a light-emitting element. For example, electrical conductivity of an electrical circuit communicably coupled to the optical sensing system may exhibit a different impedance in different thermal environments (e.g., resistance and/or reactance of the circuit may be temperature dependent). Each of these effects can compound to influence performance of the optical sensing system over time. For example, for configurations in which the optical sensing system is leveraged as a proximity sensor, signal drift and/or crosstalk effects can result in an increased quantity of false positive "not proximate" events and/or an increased quantity of false positive "is proximate" events.

In yet other examples, crosstalk induced by reflections of light emitted by the light-emitting element from layers of the display (herein, the "display stack") may further interfere with operations of the optical sensing system and/or the electronic device.

To account for these issues, as described herein, an optical sensing system self-calibrates to mitigate effects of both signal drift and crosstalk.

In particular, as noted with respect to other embodiments described herein, the optical sensing system includes two (or more) temperature sensors. A first temperature sensor is disposed within the transmitter barrel and is thermally coupled to the light-emitting element. A second temperature sensor is disposed within the receiver barrel and is thermally coupled to the photosensitive element. Each of the first and second temperature sensors can be used to thermally calibrate each of the light-emitting element and the photosensitive element such that the operational characteristics of each (e.g., how light is both emitted and received/sampled) is substantially temperature independent. In particular, the first temperature sensor can be used to modify current applied to the light-emitting element so that temperature does not have a substantial effect on the intensity, wavelength, brightness, or bandwidth of light emitted from the light-emitting element. Similarly, the second temperature sensor can be used to modify current output from the photosensitive element so that temperature does not have a substantial effect on the manner by which the photosensitive element converts intensity, wavelength, brightness, or bandwidth of light illuminating it into current. These field calibrations of the real-time operation of the light-emitting element and the photosensitive element can cooperate to substantially eliminate temperature dependence of the optical sensing system. In a more general phrasing, temperature changes to the optical sensing system may have little to no effect on the performance thereof.

In addition, in many embodiments, the transmitter barrel further encloses another photosensitive element. As with other embodiments described herein, this photosensitive element can be a photodiode. In these examples, due to close proximity of the light-emitting element and the photodiode within the transmitter barrel, the photodiode and the light-emitting element are optically coupled. In some examples, a direct optical coupling such as a waveguide can be included, but this is not required of all embodiments.

As a result of this construction, output from the photodiode within the transmitter barrel can be used in a feedback loop to immediately and in real-time calibrate optical output from the light-emitting element. In particular, output from the photodiode can be used to increment or decrement current applied to the light-emitting element in order to fine-tune light output from the light-emitting element to ensure that that light is what is expected. In this manner, the photodiode is used to perform another field calibration of the optical output of the light-emitting element.

In further examples, the first temperature sensor (or additional temperature sensors) can be additionally thermally coupled to the photodiode. In these embodiments, a temperature sampled from the first temperature sensor can be used to calibrate output(s) of the photodiode to more accurately calibrate the light-emitting element.

In yet further embodiments, additional field calibration operations (also referred to herein as simply "calibration operations") can be performed. For example, output(s) of the receiver-side photosensitive element can be passed through a high-pass filter so that changes in crosstalk interference over time (which have primarily low-frequency content; slow changes) can be automatically filtered. For example, in some embodiments, an output capacitor coupling a current output of the photosensitive element in the receiver to ground can provide a high-pass filter function.

In further embodiments, a look-up table or other database can be populated on a per-device or per system basis upon manufacturing. This table can be stored as a per-device calibration that can be further used, in addition to the foregoing and following field calibrations, to adjust output(s) of a light-emitting element and/or a photodiode of a particular optical sensing system.

These foregoing examples are not exhaustive of the types and variety of field calibrations that can be performed by and/or with an optical sensing system, as described herein.

These foregoing and other embodiments are discussed below with reference to FIGS. 1-9. However, those skilled in the art will readily appreciate that the detailed description given herein with respect to these figures is for explanation only and should not be construed as limiting.

FIG. 1 depicts an electronic device 100, including a housing 102 that encloses a stack of multiple layers, referred to as a "display stack", that cooperates to define a digital display configured to render visual content to convey information to, to solicit touch or force input from, and/or to provide entertainment to a user of the electronic device 100.

The display stack can include layers or elements such as, in no particular order: a touch input layer; a force input layer; a haptic output layer; a thin-film transistor layer; an anode layer; a cathode layer; an organic layer; an encapsulation layer; a reflector layer; a stiffening layer; an injection layer; a transport layer; a polarizer layer; an anti-reflective layer; a liquid crystal layer; a backlight layer; one or more adhesive layers; a compressible layer; an ink layer; a mask layer; and so on.

For simplicity of description, the embodiments that follow reference a display stack implanted with an organic light emitting diode display technology and can include, among other layers: a reflective backing layer; a thin-film transistor layer; an encapsulation layer; and an emitting layer. It is appreciated, however, that this is merely one illustrative example implementation and that other displays and display stacks can be implemented with other display technologies, or combinations thereof. An example of another display technology that can be used with display stacks and/or displays such as described herein is a micro light emitting diode display.

The display stack also typically includes an input sensor (such as a force input sensor and/or a touch input sensor) to detect one or more characteristics of a user's physical interaction with an active display area 104 defined by the display stack of the display of the electronic device 100.

The active display area 104 is typically characterized by an arrangement of individually-controllable, physically-separated, and addressable pixels or subpixels distributed at one or more pixel densities and in one or more pixel or subpixel distribution patterns. In a more general phrasing, the active display area 104 is typically characterized by an arrangement of individually-addressable discrete light-emitting regions or areas that are physically separated from adjacent or other nearby light-emitting regions.

In many embodiments, the light-emitting regions defining the active display area 104 are disposed onto, or formed onto, a transparent substrate that may be flexible or rigid. Example materials that can form a transparent substrate, such as described herein can include polyethylene terephthalate and/or glass. In other cases, a partially opaque substrate can be used; in such embodiments, at least a portion of the substrate between the pixels defined thereon may be partially or entirely optically transparent.

In addition, example input characteristics that can be detected by an input sensor of the electronic device 100—which can be disposed above or below a display stack, or, in other cases, can be integrated with a display stack—can include, but are not limited to: touch location; force input location; touch gesture path, length, duration, and/or shape; force gesture path, length, duration, and/or shape; magnitude of force input; number of simultaneous force inputs; number of simultaneous touch inputs; and so on.

As a result of these constructions, a user of the electronic device 100 may be encouraged to interact with content shown in the active display area 104 of the display by physically touching and/or applying a force with the user's finger to the input surface above an arbitrary or specific region of the active display area 104.

In these embodiments, as with other embodiments described herein, the display stack is additionally configured to facilitate through-display proximity sensing. In particular, the display stack further includes and/or is coupled to an optical sensing system 106 positioned relative to a rear surface of the display stack. As a result of this construction, the optical sensing system 106 can be operated by the electronic device 100 to determine whether an object is proximate to the active display area 104 of the electronic device 100.

More specifically, in one example, the display stack defines an optical sensing aperture or an array of discrete and separated optical sensing apertures (not shown) through a backing layer or other opaque layer defining a rear surface of the display stack, thereby permitting light to travel through the display stack from the front surface to the rear surface (and vice versa) between two or more organic light emitting diode subpixels or pixels (herein, "inter-pixel" regions).

In some cases, the optical sensing aperture takes a rectangular shape and is disposed on a lower region of the active display area 104, but this may not be required.

In other cases, the optical sensing aperture takes a circular or oval shape and is disposed in a central region of the active display area 104. In some embodiments, the backing layer may be omitted entirely; the optical sensing aperture may take the same size and shape as the active display area 104.

In some embodiments, multiple optical sensing apertures with different shapes are separated and supported by opaque and light absorbing backing layer or additional optical/mechanical structure.

In these embodiments, the optical sensing system 106 is positioned at least partially below the optical sensing aperture in order to collect and quantify light directed through the inter-pixel regions of the display stack, traveling through the display stack in a direction substantially opposite to a direction of travel of light emitted by the display stack.

More specifically, the optical sensing system 106 is configured to emit and capture light incident to the front surface of the display that passes through an inter-pixel region of the display stack.

In some embodiments, the optical sensing system 106 can be configured to operate with the display such that the display emits light in order to illuminate an object in contact with the front surface of the display (or an outer protective layer covering the front surface of the display). In these examples, light emitted from one or more light-emitting regions of the display (e.g., pixels) can be reflected from the surface of the object and, thereafter, can travel through the display stack, through an optical sensing aperture, and can be collected/absorbed by at least one photosensitive area or region (e.g., a photodiode) of the optical sensing system 106.

In particular, as noted with respect to other embodiments described herein, the optical sensing system 106 may be configured to emit light through the optical sensing aperture and to receive light from the optical sensing aperture. The light 108 emitted and received by the optical sensing system 106 may be used to detect the presence and/or proximity and/or range of an object 110, which may be a user of the electronic device 100.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
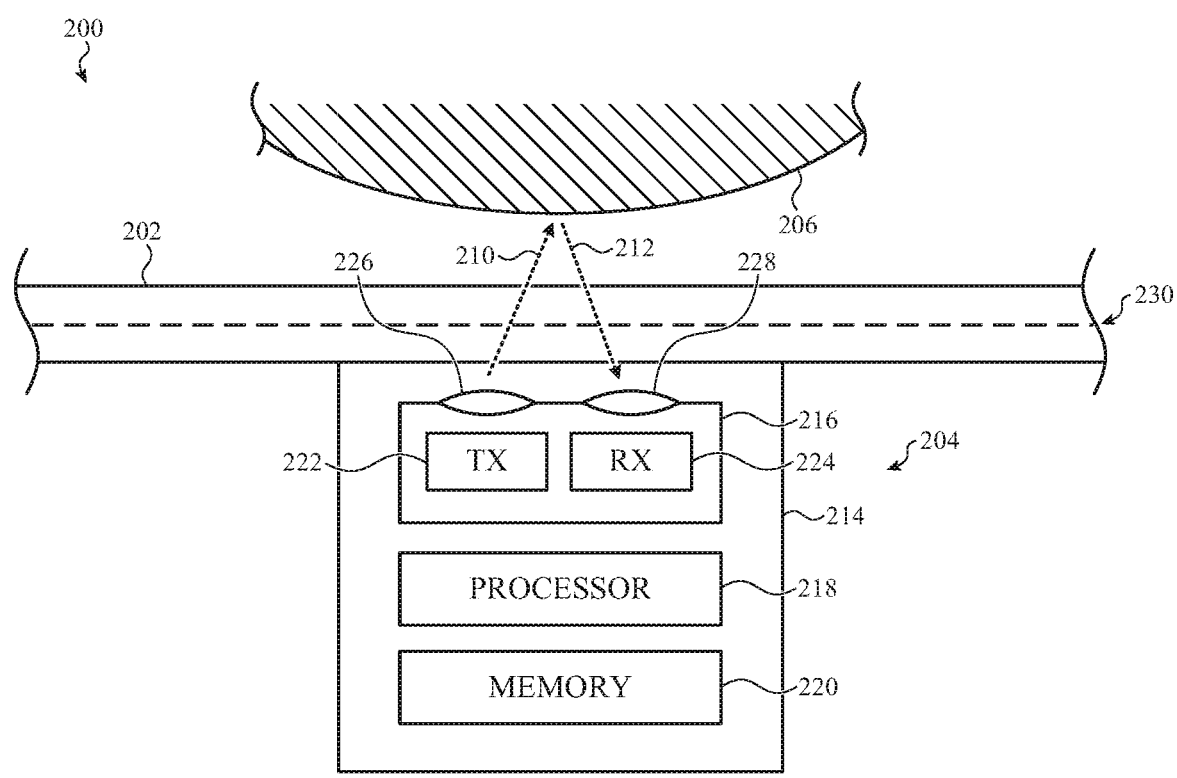
FIG. 2 depicts a cross-section view, taken through line A-A, of the optical sensing system of FIG. 1.
Figure 3:
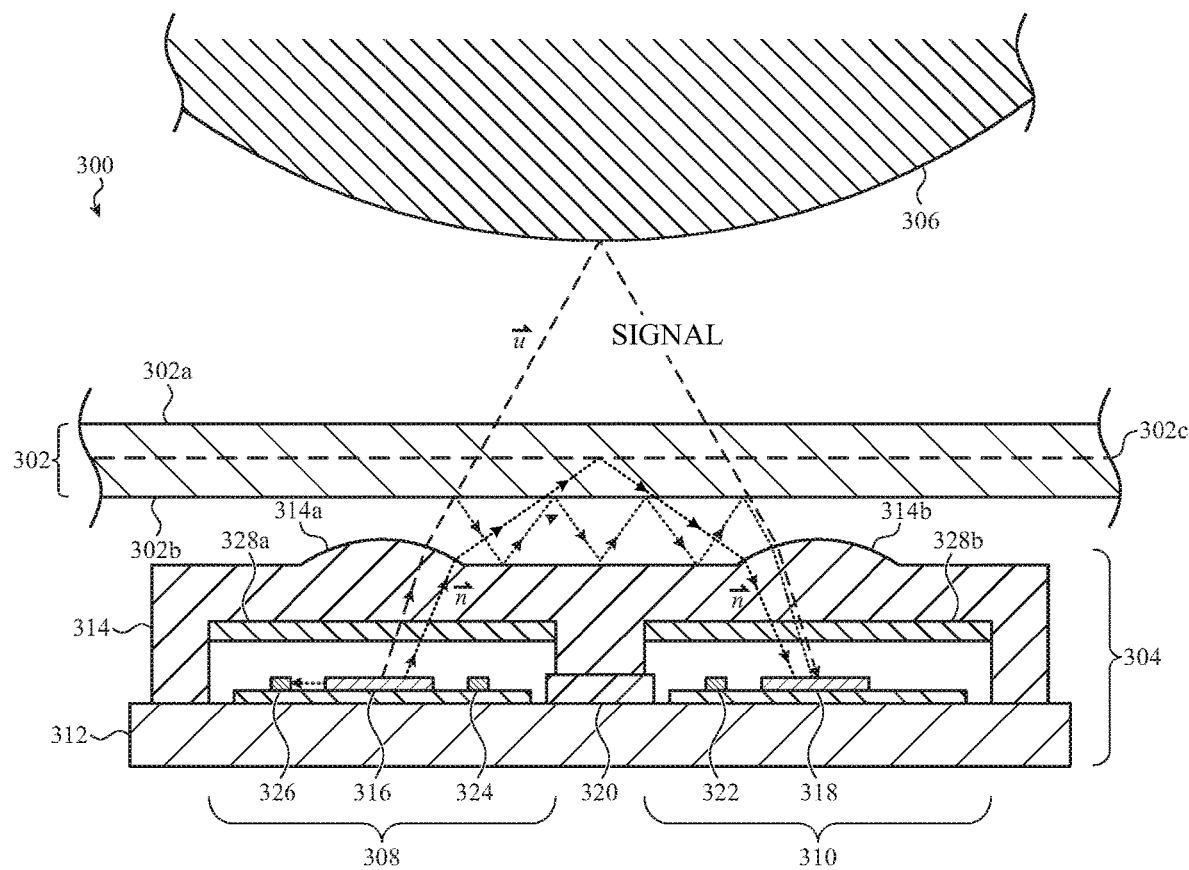
FIG. 3 depicts another cross-section view of an optical sensing system, such as described herein.

Generally and broadly, FIGS. 2-3 depict example cross-sectional views of an optical sensing system, such as described herein. In particular, FIG. 2 depicts a cross-section view through line A-A of FIG. 1. In these examples, an optical sensing system includes a transmitter side (also referred to as a "transmitter module") and a receiver side (also referred to as a "receiver module") to define a reflective sensor. As with other embodiments described herein, the transmitter side includes a light-emitting element disposed within a barrel referred to herein as a transmitter barrel and the receiver side includes a photosensitive element disposed within a second barrel, referred to herein as a receiver barrel.

As a result of the separate barrels separately enclosing the transmitter side and receiver side, the transmitter side is optically isolated from the receiver side. As a result of this construction, when the light-emitting element receives a current and emits light, that light exits the transmitter-side barrel, illuminating a field of view of the light-emitting element. If an object, such as a user, enters the field of view of the light-emitting element, at least a portion of the light emitted by the light-emitting element will be reflected back toward the optical sensing system. A portion of that reflected light can enter the receiver-side barrel to illuminate the photosensitive element which, in turn, can generate a current or voltage in proportion to one or more properties of the received light. In particular, a magnitude of the received light (e.g., brightness, amplitude, luminosity, and so on) may be proportionally related to an analog signal output from the photosensitive element. By leveraging signal(s) output from the photosensitive element, an electronic device incorporating the optical sensing system can determine or infer that an object is within a threshold distance of that device. As noted above, a sensor described herein leveraged in this manner may be referred to as a proximity sensor. A proximity sensor, as noted above, may be used by an electronic device for a number of suitable purposes including enabling or disabling a touch-sensitive display.

In these embodiments, however, a number of interference sources including both crosstalk and signal drift can influence performance of the proximity sensor and, more generally, operations or functions of the electronic device that are based on or informed by output(s) of the proximity sensor.

For example, in some embodiments, a light-emitting element may be a vertical cavity surface emitting laser ("VCSEL") and a photosensitive element may be a photodiode. As may be appreciated by a person of skill in the art, each of these semiconductor devices may be sensitive to changes in temperature. More particularly, performance of each device may change as a function of temperature.

For example, given an identical input current a VCSEL at a first temperature may emit light at a slightly different wavelength and/or a slightly different power than an identical VCSEL at a slightly different temperature. Similarly, two identical photodiodes illuminated by identical light may output different current or voltage if those photodiodes are at different temperatures. In view of these examples, a person of skill in the art may appreciate that a proximity sensor may be sensitive to signal drift; as temperature changes, performance of both a transmitter side and a receiver side may change. Problematically, as may be appreciated by a person of skill in the art, signal drift effects may cause an electronic device leveraging output(s) of a proximity sensor to incorrectly infer that an object is present when no true object is present or, oppositely, to incorrectly infer that an object is absent when a true object is present.

As one example, a cellular phone incorporating a proximity sensor may be configured to leverage an output of the proximity sensor to disable a capacitive touchscreen when a user of the cellular phone holds the cellular phone to the user's ear. The cellular phone provides this function to prevent unintended input to the capacitive touch screen. However, as noted above, when the user holds the cellular phone to the user's ear, the cellular phone and, by extension, the proximity sensor, may be heated (or cooled) by the user's body. In other cases, ambient temperature change as a result of removing the cellular phone from a pocket or bag and using the cellular phone in a cold environment. In still further examples, a cellular phone may be transported from a first temperature environment to a second temperature environment that differs from the first environment by a substantial degree (e.g., moving indoors from cold weather, moving outdoors into warm weather, and so on). A change of several degrees may occur over a relatively short period of time which, in turn, may affect performance of the proximity sensor. In other words, the user's body may cause either or both the VCSEL or photodiode of the proximity sensor to change in temperature, potentially causing output(s) of the photodiode to likewise change which, in turn, can trigger the cellular phone to unexpectedly enable the capacitive touch screen. A person of skill in the art understands that a signal drift caused by the user's body can affect performance of the proximity sensor and/or any inferences or determinations made based on outputs of the proximity sensor.

In other examples, as noted above, crosstalk interference may further contribute to poor performance of a conventional proximity sensor. For example, as noted with respect to FIG. 1, an optical sensing system as described herein is, in many embodiments, disposed below an active display area of a display of an electronic device. In this construction, a transmitter of the optical sensing system emits light through the display, and, in turn, a receiver of the optical sensing system receives light that itself has passed through the display after having been reflected from an external surface of an object in proximity of the electronic device. Also as noted above, light emitted by the transmitter may be reflected from one or more layers, surfaces, or other media of the electronic device. Examples include, but are not limited to: display stack layers; outer protective layers; antireflective coatings; housing surfaces; and so on. As a device is used, one or more of these surfaces may become damaged (e.g., scratched, smudged, warped, cracked, and so on), which in turn can change one or more crosstalk characteristics.

In other cases, manufacturing faults or field use can degrade effectiveness of optical isolation between a transmitter side and a receiver side of an optical sensing system. In each of these examples, a portion of light emitted by the transmitter is received by the receiver without having been reflected from an object external to the electronic device. As noted above this interference is referred to as crosstalk. Problematically, as may be appreciated by a person of skill in the art, if not quickly and accurately calibrated, crosstalk effects may cause an electronic device leveraging output(s) of a proximity sensor to incorrectly infer that an object is present when no true object is present or, oppositely, to incorrectly infer that an object is absent when a true object is present.

In still further examples, signal drift effects (e.g., due to temperature) may compound crosstalk effects. In other words, certain crosstalk effects may be, to a certain extent, temperature dependent. For example, various layers of an electronic device (e.g., display layers, housing layers, antireflective coatings, oleophobic coatings, and so on; referred to herein collectively as "crosstalk media") may dimensionally change in response to changes in temperature, which in turn may change a quantity of crosstalk light reflected therefrom received by the receiver. In other cases, a light emitter of a transmit side may shift a band of light emitted therefrom given a particular temperature. The "shifted" band of light emitted by the light emitter may be reflected and/or absorbed by various crosstalk media in a different manner. Briefly, it may be appreciated that, in many examples, signal drift effects and crosstalk effects may not be independent interference(s) and, in some cases, may influence and/or exacerbate one another. In other words, the compound effect of thermal drift and high crosstalk of certain embodiments (such as embodiments for which a light-emitting element is particularly sensitive to changes in temperature, for which layers above an optical sensing system are particularly reflective, and/or a photodiode is particularly sensitive to mechanical changes due to changes in temperature), can cooperate to substantially impact performance of an optical sensing system.

To account for these issues, embodiments described herein and illustrated in FIGS. 2-3, include several independent (optionally, real-time) calibrations to reduce and/or eliminate cooperative and independent effects of signal drift and crosstalk. As a result of these described and illustrated structures and methods of operation, an optical sensing system as described herein can accurately and precisely operate while positioned below an active display area of a display of an electronic device, thereby reducing manufacturing complexity of the electronic device and improving an aesthetic appearance of an enclosure or housing of that electronic device by reducing bezel regions surrounding the display.

In particular, to account for signal drift effects, embodiments described herein include two separate and dedicated thermal sensors, also referred to as temperature sensors. In particular, a first temperature sensor is disposed within the transmitter barrel and a second temperature sensor is disposed within the receiver barrel. In this manner, the first temperature sensor is thermally coupled to the light-emitting element within the transmitter barrel and the second temperature sensor is thermally coupled to the photosensitive elements in the receiver barrel. As a result of this construction, input (e.g., current) to the light-emitting element can be calibrated to regulate light output of the light-emitting element, thereby mitigating effects of temperature on the light-emitting element. Similarly, output of the photosensitive element can be calibrated to regulate current or voltage output(s) of the photosensitive element thereby mitigating effects of temperature on the photosensitive element.

More particularly, in one embodiment, an electronic device operated by a user includes an optical sensing system as described herein. The transmitter side of the optical sensing system includes a first temperature sensor disposed adjacent to a VCSEL (or other light source) used to emit light at a particular brightness, within a particular bandwidth or at a particular wavelength. Each of these elements is disposed within a transmitter barrel that includes an open end (that is optionally capped with a lens or other optical element, such as an optical filter) through which light emitted by the VCSEL can pass. In addition, the receiver side of the optical sensing system includes a receiver barrel that encloses a photodiode and a second temperature sensor. In this construction, the transmitter barrel and the receiver barrel can be coupled together to define a module housing for the optical sensing system. As with other embodiments described herein, the module housing can be disposed below an active display area of an electronic device display, such as an organic light emitting diode display. As a result of this construction, when the VCSEL is stimulated or driven with a current, the VCSEL emits light that passes through the active display area (e.g., between pixels of the organic light emitting diode display) and exits the electronic device to illuminate a field of view of the transmitter barrel. When the user of the electronic device is within the field of view of the transmitter barrel, at least some light emitted by the VCSEL is reflected back toward the optical sensing system and, in particular, the receiver barrel of the optical sensing system. As with other embodiments described herein, the reflected light traverse the active display area (e.g., inter-pixel regions) and enters the receiver barrel to illuminate the photodiode.

In this example, as the user holds the electronic device, the user's body heat (or another cause of a thermal gradient changing temperature of the electronic device) may change a temperature of the electronic device and, by extension, the optical sensing system. In other cases, operation of the electronic device and/or the optical sensing system can result in self-heating or self-cooling of the optical sensing system. As noted above, one or more performance characteristics and/or operational properties of the VCSEL and/or photodiode may change as the temperature of those components change. However, in this construction, each of the first and second temperature sensors can be used to account for these changes.

In particular, the first temperature sensor can be used to adjust a current input to the VCSEL such that, as the VCSEL's temperature changes, current applied to it can also change to regulate one or more of: power output from the VCSEL (e.g., brightness of emitted light); wavelength of light emitted from the VCSEL; bandwidth output from the VCSEL; and so on. As a result of this construction, the first temperature sensor can be leveraged to ensure that output from the VCSEL does not change (or only changes minimally) as a function of temperature. In addition, the first and/or second temperature sensors can be used to calibrate a photodiode within the transmitter side.

In a more particular construction, the first temperature sensor can be sampled at a fixed interval and/or a variable interval and/or on demand and a temperature value can be obtained. More specifically, if the first temperature sensor measures temperature and outputs a voltage that corresponds to the measured temperature, the voltage may be quantized and/or otherwise digitized and correlated to a digital value corresponding to the measured temperature. In another example, if the first temperature sensor measures temperature as a function of electrical resistance, embodiments described herein can include a resistance measuring circuit such as a Wheatstone bridge or voltage divider to convert a variable resistance into a voltage that, in turn, can be digitized and correlated to a digital value representing the measured temperature. A person of skill in the art will readily appreciate that a number of temperature sensing technologies and techniques can be leveraged by an optical sensing system as described herein; for simplicity of description, the embodiments that follow reference temperature sensors that provide output as a digital value corresponding to the measured temperature. However, it may be appreciated that this is merely one example and that many intermediate values and/or conversions to and/or from analog values to digital values can exist in certain implementations.

Continuing the preceding example, in one embodiment, the VCSEL may be driven by a current defined by a digital value that, in turn, can be biased and/or modified based on the temperature measured by the first temperature sensor. For example, in one embodiment, a digital value received from a processor of the electronic device (or retrieved from a memory of the optical sensing system or electronic device) can be converted into an analog current by a digital to analog converter. The analog current level output from the digital to analog converter can be supplied to the VCSEL to drive the VCSEL and cause the VCSEL to emit light. In such embodiments, digital output from the first temperature sensor can be leveraged to modify the digital current value used to define a level of current applied to the VCSEL. In other words, in some embodiments, calibration operations levering output(s) from the first temperature sensor can be performed in the digital domain.

The manner by which output(s) from the first temperature sensor can be leveraged to bias, change, or otherwise modify characteristics of light output of the VCSEL by modifying current/power/voltage applied thereto can vary from embodiment to embodiment. In one example, a lookup table can be used. In particular, a lookup table stored in a memory can store digital current values keyed to temperature values. In this example, a processor associated with the electronic device or with the optical sensing system can query the lookup table with the digital temperature value sampled from the first temperature sensor to obtain a digital current value that, in turn, can be used to drive the VCSEL. In other cases, the lookup table can store a bias value that can be used to increment or decrement a digital current value. These preceding examples are not exhaustive; it may be appreciated by a person of skill in the art that digital values sampled from a temperature sensor thermally coupled to a VCSEL as described herein can be leveraged in a number of suitable ways to change a current (or voltage or power) input to the VCSEL.

In a similar manner, the second temperature sensor can be used to adjust an output of the photodiode such that, as the photodiode's temperature changes, output from it remains the same given the same illumination power and spectrum (including both wavelength and bandwidth). As a result of this construction, and as noted above, the second temperature sensor can be leveraged to ensure that output from the photodiode does not change (or only changes minimally) as a function of temperature.

As a result of this construction, the second temperature sensor can be sampled at a fixed interval, a variable interval, and/or on demand and a temperature value can be obtained therefrom. In these examples, an analog output of the photodiode (e.g., a current, a voltage, a power, and so on) can be digitized with an analog to digital converter and defined by a digital value that, in turn, can be biased and/or modified based on the temperature measured by the second temperature sensor.

As with the VCSEL and the first temperature sensor referenced above, the manner by which output(s) from the second temperature sensor can be leveraged to bias, change, or otherwise modify output(s) of the photodiode can vary from embodiment to embodiment. In one example, as with preceding examples, a lookup table can be used. In particular, a lookup table stored in a memory can store digital power, voltage, or current values keyed to temperature values. In this example, a processor associated with the electronic device or with the optical sensing system can query the lookup table with the digital temperature value sampled from the second temperature sensor to obtain a biasing value that, in turn, can be used to modify (e.g., increment, decrement, bias, scale, filter, and so on) raw output from the photodiode. These preceding examples are not exhaustive; it may be appreciated by a person of skill in the art that digital values sampled from a temperature sensor thermally coupled to a photodiode as described herein can be leveraged in a number of suitable ways to change an analog measurement of current (or voltage or power) output from the photodiode.

In this manner, the first temperature sensor can be used to thermally calibrate the operations of the VCSEL, thereby reducing effects of signal drift from the transmitter side and the second temperature sensor can be used to thermally calibrate the operations of the photodiode, thereby reducing effects of signal drift from the receiver side. In still further embodiments, the first and second temperature sensors can be used to calibrate the other system as well; the first temperature sensor can be used to calibrate an output of the photodiode and the second temperature sensor can be used to calibrate an input to the VCSEL. More particularly, in these examples, a lookup table can inform how output from the photodiode should be biased based on a temperature of the VCSEL and vice versa. As such, in these examples and embodiments, four simultaneous real-time calibrations can be performed to adjust inputs to and outputs from the VCSEL and/or the photodiode.

In still further examples, crosstalk calibration may be additionally performed. In many embodiments, a crosstalk calibration operation can be performed when the electronic device is in a known state, such as an idle state. In one example, a sensor within the electronic device (or in certain embodiments, within the optical sensing system itself) can be used to determine when an electronic device is placed on a surface or is otherwise not being actively used/manipulated by a user. In other cases, a calibration operation can be performed when no proximity target (e.g., any object) is within a field of view of the optical sensing system.

A person of skill in the art may readily appreciate that other sensors and/or sensing systems can be used to determine an idle state of an electronic device including, but not limited to: power consumption sensors; gyroscopes; magnetometers; capacitive touch screens; force input sensors; optical imaging systems (e.g., two or three dimensional cameras), and the like. In other cases, a crosstalk calibration can occur based on a software state. For example, if a cellular telephony software application is not active, the electronic device may perform a crosstalk calibration operation.

Upon determining that the electronic device is idle or otherwise not being used by a user, a crosstalk calibration operation can be performed. In such examples, the VCSEL can be driven and the photodiode can be sampled to determine crosstalk between the transmitter side and the receiver side of the optical sensing system. This calibration value may be a scalar value that can be subtracted from an output of the photodiode at a later time. Such operations can be referred to herein as "crosstalk baselining" operations or "crosstalk calibration" operations. In many cases, crosstalk baselining can occur on a regular or scheduled basis.

In some cases, crosstalk calibration may be wavelength, bandwidth, and/or temperature dependent. For example, in some embodiments, the VCSEL may be configured to output multiple frequencies of light, either simultaneously (e.g., via a VCSEL array) or in sequence (e.g., via different current signals sent to the VCSEL). In such examples, different frequencies of light may be associated with different crosstalk characteristics; certain frequencies may reflect from and/or may be attenuated or beam-shaped by the crosstalk media of the electronic device in a different manner than other frequencies. In these embodiments, lookup tables may be leveraged by the optical sensing system in order to calibrate wavelength-specific and/or temperature-specific crosstalk.

These foregoing examples are not exhaustive of various calibration operations that can be performed by and/or to an optical sensing system such as described herein. For example, in many embodiments, a transmitter-side barrel can further enclose a second photodiode used to provide real-time calibration of light output from the VCSEL or, more generally, from a light-emitting element within the transmitter side of a module enclosure of an optical sensing system, as described herein. In these examples, light output from the light-emitting element, and one or more characteristics thereof (e.g., power, wavelength, bandwidth) may be calibrated in real-time in a feedback loop. In other words, the second photodiode can be used to regulate and/or normalize light output from the light-emitting element in addition to any and all preceding described calibration operations. In further constructions, an additional photodiode can be positioned within the receiver barrel and can be specifically configured for crosstalk calibration.

In view of the foregoing, it may be appreciated that, generally and broadly, an optical sensing system as described herein includes a module housing that itself defines two optically isolated barrels. A transmitter module or transmitter side of the optical sensing system includes a transmitter barrel that encloses a light-emitting element, which may be a VCSEL or an array of VCSELs. The transmitter barrel may further enclose a temperature sensor and a photodiode (or array thereof) that can each be used to apply real-time and/or on-demand thermal and optical calibration of the light-emitting element. The temperature sensor is thermally coupled to the light-emitting element and the photodiode is optically coupled to the light-emitting element. Similarly, a receiver module or receiver side of the optical sensing system includes a receiver barrel that encloses a photosensor or photosensitive element, such as a photodiode, and another temperature sensor. The second temperature sensor is thermally coupled the photosensor just as the first temperature sensor is thermally coupled to the light-emitting element. In many embodiments, the module housing further includes an application-specific integrated circuit ("ASIC") that in turn includes a processor and a memory. The processor may be operationally coupled to each element of the transmitter side and receiver side of the optical sensing system and may be configured to perform, coordinate, and/or otherwise facilitate one or more operations of the optical sensing system. The memory can be used to store one or more lookup tables such as described above. The light-emitting element(s) and photosensitive element(s) of an optical sensing system as described herein can be configured to operate within any suitable band of light including visible light, infrared light, ultraviolet light, and so on. In some examples, an optical sensing system may switch between different bands of light in different modes. For example, in a first mode, infrared sensing may be used, whereas in a second mode visible light may be used.

As a result of these described constructions (such as shown in FIGS. 2-3), an optical sensing system can self-calibrate to substantially reduce effects of signal drift and crosstalk. Example real-time calibration operations that can be performed by an ASIC or a processor thereof include: thermal calibration of the light-emitting element; thermal calibration of the photosensor; optical calibration of the light-emitting element; crosstalk calibration of one or both of the photosensor or the light-emitting element; and so on. In many examples, the ASIC (or a processor thereof) can be configured to perform each of these calibration operations within the digital domain for simplicity. As a result of these calibration operations, accuracy and precision of the optical sensing system is dramatically improved, enabling the optical sensing system to be positioned behind a display of an electronic device to be leveraged as a proximity sensor configured to detect whether an object is within a field of view of that sensor and, if so, to infer that an object is in proximity of the display of the electronic device. A person of skill in the art can readily appreciate that thresholding may be used by the optical sensing system to output a binary determination of whether an object is sufficiently close to the electronic device to be considered proximate. In other cases, the optical sensing system may output a digital representation of distance separating the optical sensing system and the object, although this is not required of all embodiments.

For example, in one embodiment, an ASIC of an optical sensing system as described herein is instructed to determine whether an object is in proximity of the electronic device. In response, the ASIC (or a processor thereof) can access a memory to determine a digital value corresponding to a target wavelength, bandwidth, and/or brightness of light to be emitted by the transmitter side. Thereafter, ASIC can access a lookup table or perform a calculation to determine a corresponding current or power value necessary to drive the light-emitting element of the transmitter side so that the light-emitting element emits the desired light. This digital current value can thereafter be supplied to a digital-to-analog converter which, in turn, can drive the light-emitting element. In addition, the ASIC can sample a digital temperature value from a transmitter-side temperature sensor thermally coupled to the light-emitting element. The digital temperature value can thereafter be used to query another lookup table to determine whether the digital current value should be biased based on temperature. Upon driving the light-emitting element, the ASIC can sample a transmitter-side photodiode optically coupled to the light-emitting element to determine whether the digital current value should be incremented, decremented, biased, or otherwise changed to actually achieve the desired target wavelength, bandwidth, and/or brightness of light to be emitted by the transmitter side. In addition, the ASIC can sample a photosensor in the receiver side to determine a digital output value corresponding to light received by that photosensor. The ASIC can calibrate output of the photosensor (e.g., in the digital domain) based on a sample of a temperature sensor thermally coupled to the photosensor. The ASIC can subtract a crosstalk baseline from the digital output value and/or can perform additional filtration operations such as high-pass filtering. Thereafter, the ASIC can compare the (optionally filtered) output of the photosensor to determine whether an object is within a field of view of the optical sensing system. In many embodiments, the optical sensing system can be configured to provide a digital binary output to an electronic device incorporating the optical sensing system.

The foregoing examples are not exhaustive; a person of skill in the art may readily appreciate that multiple calibration operations can be simultaneously or sequentially performed to improve accuracy and precision of a system as described herein. In some cases, different sets of possible calibration operations may be selected in different circumstances. For example, thermal calibration operations may be disabled or not used if temperature exceeds a high threshold or falls below a low temperature threshold. Similarly, in some cases, crosstalk calibration may not be required of all embodiments.

Further, it may be appreciated that a system as described herein may not operate exclusively with one target wavelength, bandwidth, or brightness/amplitude of light. More particularly, in many embodiments, light output from a light-emitting element may be modulated to a particular wavelength or according to particular pattern. Similarly, output(s) from a receiver-side photosensor may be demodulated. In some cases, different light characteristics may be selected; for certain objects, different bandwidths of light may be preferred.

Further, it may be appreciated that the example use-case of behind-display proximity sensing is merely one example use of a system as described herein. Other embodiments or implementations can be configured in other ways and for other purposes. Examples include, but are not limited to: biometric imaging; optical imaging; rangefinding; optical communications; and so on. For simplicity of description, the embodiments that follow reference an example use case in which an optical sensing system is leveraged as a proximity sensor positioned behind a display of an electronic device and includes a dedicated ASIC.

These and other examples are presented below with reference to FIGS. 2-3. In particular, FIG. 2 depicts a cross-section view, taken through line A-A, of the optical sensing system of FIG. 1.

In particular, FIG. 2 illustrates an electronic device 200 that includes a housing that defines an interior volume to enclose and support a display 202. Within the interior volume of the housing, behind the display 202, is an optical sensing system 204. The optical sensing system 204 can be used to detect proximity of an object 206, which is a user of the electronic device 200. For example, if the electronic device 200 is a portable electronic device such as a cellular phone, the optical sensing system 204 can be leveraged as a proximity sensor that determines when and/or whether the cellular phone should disable a capacitive touch screen (e.g., when a user of the cellular phone holds the cellular phone nearby the user's head/ear).

As with other embodiments described herein, the optical sensing system 204 can be configured to emit light 210 through the display 202. The light 210 exits the housing of the electronic device 200 to illuminate a field of view normal to and/or extending from an external surface of the display 202. When the object 206 enters the field of view, at least a portion of the light 210 is reflected from an external surface of the object 206. The reflected light 212 is redirected toward the outer surface of the display 202. At least a portion of the reflected light 212 can traverse through the display 202 and can illuminate the optical sensing system 204. The optical sensing system 204 can leverage this illumination to determine whether the object 206 is proximate to, or within at least a threshold distance of, the external surface of the electronic device 200.

The optical sensing system 204 is enclosed within a module housing 214 that encloses and supports at least a portion of the internal components thereof. As with other embodiments described herein, the module housing 214 defines a transmitter side and a receiver side. In particular, the module housing 214 defines a set of barrels 216 that includes a transmitter barrel and a receiver barrel that are optically isolated from one another to minimize crosstalk therebetween.

The module housing 214 also encloses and supports an ASIC that includes at least a processor 218 and a memory 220. In other cases, the processor 218 and the memory 220 can be formed on separate dies and/or within separate integrated circuit packages. The processor 218 can be a general purpose processor configured to access the memory 220 to obtain executable instructions, computer code, and/or other digital assets that can be leveraged by the processor 218 to instantiate an application, firmware, or other process or instance of software. In other cases, the processor 218 may be a purpose-configured processor configured to receive digital input(s) and to provide digital and/or analog output(s). As such, as described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory (such as the memory 220). This term is meant to encompass a single processor or processing unit, multiple processors, multiple processing units, analog or digital circuits, or other suitably configured computing element or combination of elements.

Regardless of configuration, the processor 218 can be operationally and/or communicably coupled to the memory 220 and/or to other electronic components of the electronic device 200 or the optical sensing system 204. For example, the processor 218 can be operably coupled to a transmitter module 222 and a receiver module 224. As a result of these constructions, the processor 218 can be leveraged to perform one or more field calibration operations of the transmitter module 222 or the receiver module 224, such as described herein. Such calibrations can include, but may not be limited to: thermal calibration of a light-emitting element of the transmitter module 222; thermal calibration of a photosensitive element or photosensor of the receiver module 224; crosstalk calibration of an output of the receiver module 224; optical calibration of the transmitter module 222; and so on.

The memory 220 of the ASIC can be used, as noted above, to store assets that can be leveraged by the processor 218. In other cases, the memory 220 can be used to store one or more lookup tables that can be used to calibrate (e.g., a field calibration) the optical sensing system 204, such as described herein. In certain further embodiments, the optical sensing system 204 can further include one or more lenses, such as the transmitter-side lens 226 and the receiver-side lens 228.

As a result of the depicted construction, the optical sensing system 204 can be calibrated in real time by the processor 218 such that the light 210 emitted by the transmitter module 222 can pass through the display 202 (and, in particular, between inter-pixel regions of a pixel layer 230 of the display 202), reflect from the object 206, pass through the display 202 and the pixel layer 230 again, and enter the receiver module 224.

FIG. 3 depicts another cross-section view of an optical sensing system, such as described herein. FIG. 3 presents a more detailed view of the example system diagram shown in FIG. 2. In particular, FIG. 3 depicts an electronic device 300 that, as with other embodiments described herein, includes a housing that defines an interior volume. Within the interior volume defined by the housing is disposed a display 302 that is defined, at least in part, by a stacking or layering of functional and structural layers in a display stack. The display stack of the display 302 defines an outer surface 302a and an interior surface 302b. An active display area of the display 302 is defined by an arrangement of pixels in turn defined in a pixel layer 302c. The pixel layer 302c is at least partially optically transparent between pixels or subpixels of the layer so that light emitted from an optical sensing system 304 may traverse the active display area and exit the electronic device 300 through the outer surface 302a to illuminate an object 306.

In particular, as with other embodiments described herein, the optical sensing system 304 includes a transmitter side 308 and a receiver side 310. The transmitter side 308 and the receiver side 310 can be formed onto a rigid substrate 312. The rigid substrate 312 can serve as a support and/or platform to couple to a module housing 314 that optically separates or isolates the transmitter side 308 from the receiver side 310.

The transmitter side 308 includes a light-emitting element 316. The light-emitting element 316 can be any suitable light emitting element, but in many embodiments, the light-emitting element 316 is implemented as a VCSEL and configured to emit infrared light. In other embodiments, the light-emitting element 316 is a semiconductor light source such as, but not limited to: a vertical external-cavity surface-emitting laser; a light-emitting diode; an organic light-emitting diode; a resonant-cavity light-emitting diode; a micro-scale light-emitting diode; a superluminescent light-emitting diode; a broad-area laser diode; a diode-pumped laser; a mode-locked diode laser; an infrared band laser; an ultraviolet band laser; and so on. The light-emitting element 316 can be implemented as a single element or as an array of discrete elements. For simplicity of description, the embodiments that follow reference a source device including at least one VCSEL light source (hereinafter, a "laser" or "laser diode") that emits light in a spectral range including a traditionally non-visible wavelength band (e.g., infrared light). Further, although not required for all embodiments, the example VCSEL light source described in reference to many embodiments that follow is presumed to be a Class 1 laser as defined by the American National Standards Association.

The light-emitting element 316 is configured to emit light at a particular wavelength, bandwidth, or power through the display 302 to illuminate a field of view extending from the outer surface 302a. When the field of view is interrupted by the object 306, at least a portion of the emitted light reflects from the object 306 and returns to the optical sensing system 304 by traversing, once again, through the display 302. In particular, the reflected emitted ligh• can illuminate a photosensor 318 within the receiver side 310.

The photosensor 318 can be any suitable photosensitive element or structure. For simplicity of description, the embodiments that follow reference a semiconductor photodiode (hereinafter, a "photodiode"). The photosensitive area of this example photodiode is responsive to light in the spectral range emitted by the light-emitting element 316. As with the light-emitting element 316, the photosensor 318 of the receiver side 310 can be implemented as a single element or as an array of elements.

Both the photosensor 318 and the light-emitting element 316 are operably coupled to an ASIC 320. The ASIC 320 can be configured to drive the light-emitting element 316 with a current, a modulated current, or any other suitable current-controlled, power-controlled, or voltage-controlled signal. In many examples, the ASIC 320 is configured to drive the light-emitting element 316 with a current signal configured to cause the light-emitting element 316 to emit modulated infrared light toward the object 316. In addition, the ASIC 320 can be configured to receive a current, voltage, or power signal from the photosensor 318.

As with other embodiments described herein, the transmitter side 308 and the receiver side 310 can each include multiple sensors leveraged for calibration of the light-emitting element 316 and the photosensor 318. In particular, the receiver side 310 includes a temperature sensor 322 that is thermally coupled to the photosensor 318 and operably coupled to the ASIC 320. In these constructions, the ASIC 320 can leverage a digital output of the temperature sensor 322 to access a lookup table stored in a memory of the ASIC 320 to adjust a digital output of the photosensor 318. In this manner, the ASIC 320 can leverage output(s) of the temperature sensor 322 to field calibrate the outputs(s) of the photosensor 318 to mitigate effects of signal drift.

Similarly, the transmitter side 308 can also include a temperature sensor 324 that is thermally coupled to the light-emitting element 316 and operationally or operably coupled to the ASIC 320. As with other embodiments described herein, the ASIC 320 can leverage the temperature values sampled from the temperature sensor 324 to adjust power/current/voltage input to the light-emitting element 316 to mitigate effects of signal drift.

In many embodiments, the optical sensing system 304 also includes a photodiode 326 within the transmitter side 308. The photodiode 326 can be used by the ASIC 320 to calibrate an operation of the light-emitting element 316 as described above. In further embodiments, a calibration photodiode can also be included in the receiver side 310 and may be positioned within the receiver-side barrel, outside of the module housing, or elsewhere.

The construction depicted in FIG. 3 is, as noted above, merely one example construction that facilitates mitigation of signal drift and facilitates compensation for crosstalk noise. However, it may be appreciated that the example construction depicted is merely one example and other embodiments can be constructed in other ways. For example, in some embodiments, optical elements can be leveraged to focus or diffuse the emitted light or filter the emitted light in any particular preferred manner. For example, the module housing 314 is depicted in FIG. 3 with optical elements 314a and 314b formed with the module housing 314. In other cases, filters such as a visible light cut filter 328a, 328b can be included as well.

These foregoing embodiments depicted in FIGS. 2-3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
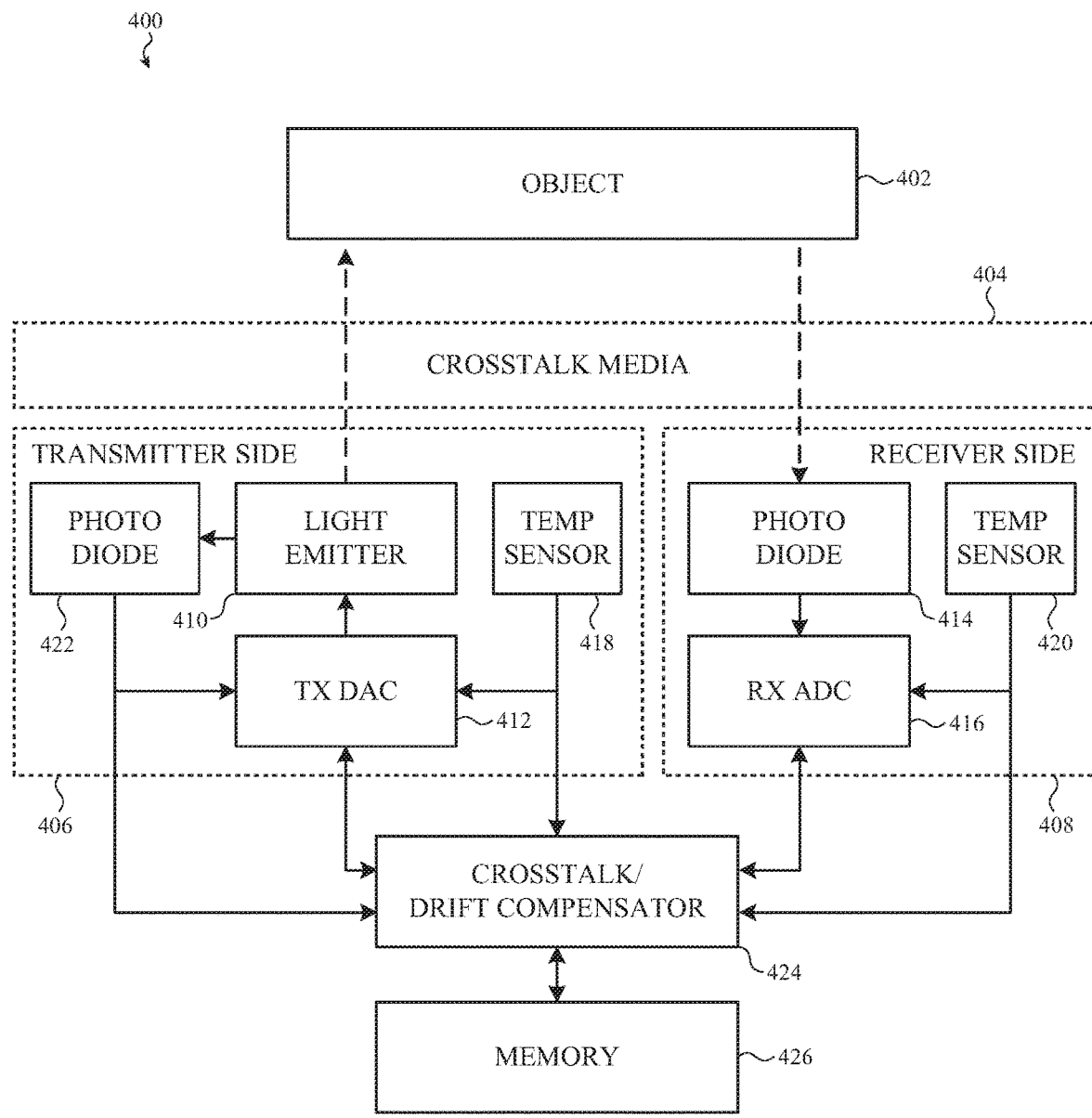
FIG. 4 depicts a system diagram of an optical sensing system, such as described herein.

For example, FIG. 4 depicts a simplified system diagram of an optical sensing system, such as described herein. The optical sensing system 400 is configured to detect presence of and/or distance to an object 402, through an arbitrary crosstalk media 404. An example of a crosstalk media is a display stack of an electronic device (see, e.g., FIGS. 2-3). In other examples, other crosstalk media may be present.

The optical sensing system 400 includes a transmitter side 406 and a receiver side 408. The transmitter side 406 includes a light emitting element, shown as the light emitter 410. The light emitter 410 receives an analog power or current signal from a digital-to-analog converter 412. In this manner, a digital current value received by the digital-to-analog converter 412 is converted to an analog current which, in turn, causes the light emitter 410 to emit light, such as modulated infrared light.

Similarly, the optical sensing system 400 includes a receiver side 408 that includes a photodiode 414. The photodiode 414 is configured to receive light emitted from the light emitter 410. Some of the light emitted by the light emitter 410 may traverse the crosstalk media 404 and be received by the photodiode 414, whereas other light emitted by the light emitter 410 may traverse the crosstalk media 404 and reflect from the object 402. A current, voltage, and/or power signal output from the photodiode 414 can be received as input by an analog-to-digital converter 416 of the receiver side 408.

The optical sensing system 400 also includes a temperature sensor 418 in the transmitter side 406 and a temperature sensor 420 in the receiver side 408. In many embodiments, the transmitter side 406 further includes a photodiode 422 that is optically coupled to the light emitter 410. The temperature sensor 418 is thermally coupled to either or both the photodiode 422 or the light emitter 410. The temperature sensor 420 is thermally coupled to the photodiode 414.

Each of the photodiode 422, the temperature sensor 420, and the temperature sensor 418 provide output(s) to (and/or may be sampled by) a crosstalk/signal drift compensator 424 that is configured to access a memory 426. The memory 426 stores one or more lookup tables that can be used by the crosstalk/signal drift compensator 424 to perform one or more field calibrations in real-time of the optical sensing system 400.

For example, the crosstalk/signal drift compensator 424 can sample a temperature of the temperature sensor 418 and, in response, access a lookup table in the memory 426 that correlates temperature of the light emitter 410 with a current applied to the light emitter 410. Based on an output of the lookup table, the crosstalk/signal drift compensator 424 can adjust a digital value supplied as input to the digital-to-analog converter 412 so as to change the current applied to the light emitter 410 to regulate wavelength output, bandwidth output, and/or brightness output from the light emitter 410. In this manner, the crosstalk/signal drift compensator 424 compensates for signal drift of the light emitter 410.

In addition, the crosstalk/signal drift compensator 424 can sample a temperature of the temperature sensor 420 and, in response, access a lookup table in the memory 426 that correlates temperature of the photodiode 414 with a current received from to the photodiode 414. Based on an output of the lookup table, the crosstalk/signal drift compensator 424 can adjust a digital value received from the analog-to-digital converter 416 so as to change the current applied to (e.g., as bias) and/or current received from the photodiode 414 to regulate output from the photodiode 414. In this manner, the crosstalk/signal drift compensator 424 compensates for signal drift of the photodiode 414. The crosstalk/signal drift compensator 424 can include a real-time filter (e.g., a proportional-integral-derivative controller) configured to correlate one or more historical, current, and/or predicted characteristics of noise (e.g., crosstalk and/or signal drift) in order to adjust output(s) of the light emitter 410.

Additionally, the crosstalk/signal drift compensator 424 can sample an output of the photodiode 422 and, in response, access a lookup table in the memory 426 that correlates one or more characteristics of light emitted by the light emitter 410 with a current applied to the light emitter 410. Based on an output of the lookup table, the crosstalk/signal drift compensator 424 can adjust a digital value supplied as input to the digital-to-analog converter 412 so as to change the current applied to the light emitter 410 to regulate wavelength output, bandwidth output, and/or brightness output from the light emitter 410. In this manner, the crosstalk/signal drift compensator 424 regulates real-time output of the light emitter 410. In some cases, the crosstalk/signal drift compensator 424 can also use the temperature sensor 418 to compensate one or more operations of the photodiode 422.

The crosstalk/signal drift compensator 424 can also provide filters and/or other calibrations or compensations to an output of the optical sensing system 400, such as by applying a low pass filter to an output of the analog-to-digital converter 416.

One or more parameters of a feedback control filter (e.g., a real time filter) and crosstalk-mitigation filter (for example, a low pass filter) can be designed, calibrated and adjusted in real time to meet optimal sensing performance, for example to bias away from zero mean, to respond fast or slower, and so on in order to mitigate proximity detection failures.

These foregoing embodiments depicted in FIG. 4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
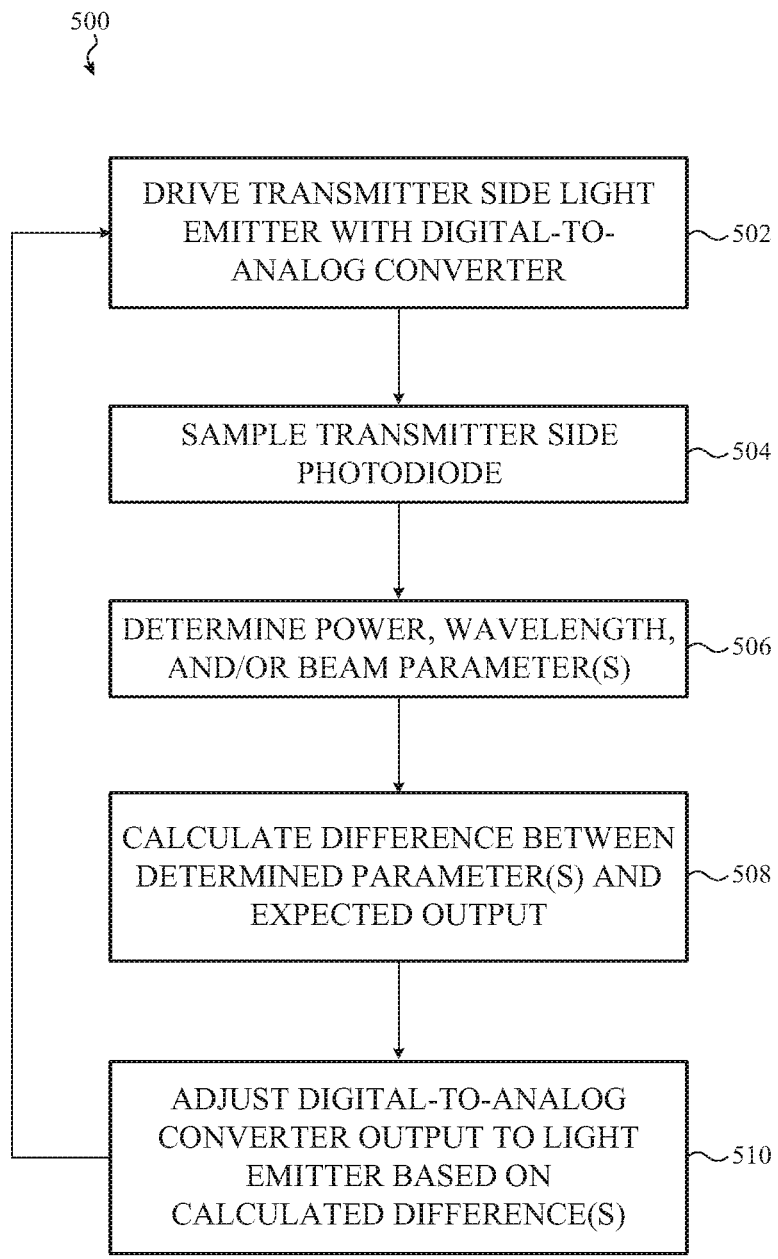
FIG. 5 is a flowchart depicting example operations of a method of operating an optical sensing system, such as described herein.

FIG. 5 is a flowchart depicting example operations of a method of operating an optical sensing system, such as described herein. The method 500 can be performed by any suitable hardware or software, but in many embodiments may be performed in whole or in part by an ASIC, such as described herein.

The method 500 includes operation 502 in which a transmitter side light emitter is driven from an output of a digital-to-analog converter. Next, at operation 504, a transmitter side photodiode (or an array of photodiodes) can be sampled. The method 500 advances to operation 506 at which one or more power, wavelength, optical, frequency, or beam properties of the light emitted by the transmitter side light emitter are determined from the sample(s) of the signal received from the transmitter side photodiode. The method 500 advances to operation 508 at which a difference between an expected value and the value sampled at operation 506 is determined. For example, if an expected value of brightness exceeds a measured/sampled value of brightness (whether compared digitally or in an analog domain), a difference between those values is determined. Finally, at operation 510 the difference determined at operation 508 can be leveraged to adjust one or more outputs of the digital-to-analog controller driving the light emitter. Thereafter, the method 500 may return to operation 502 and continue. In this embodiment, an optical calibration operation of an output of a light emitter is performed.

Figure 6:
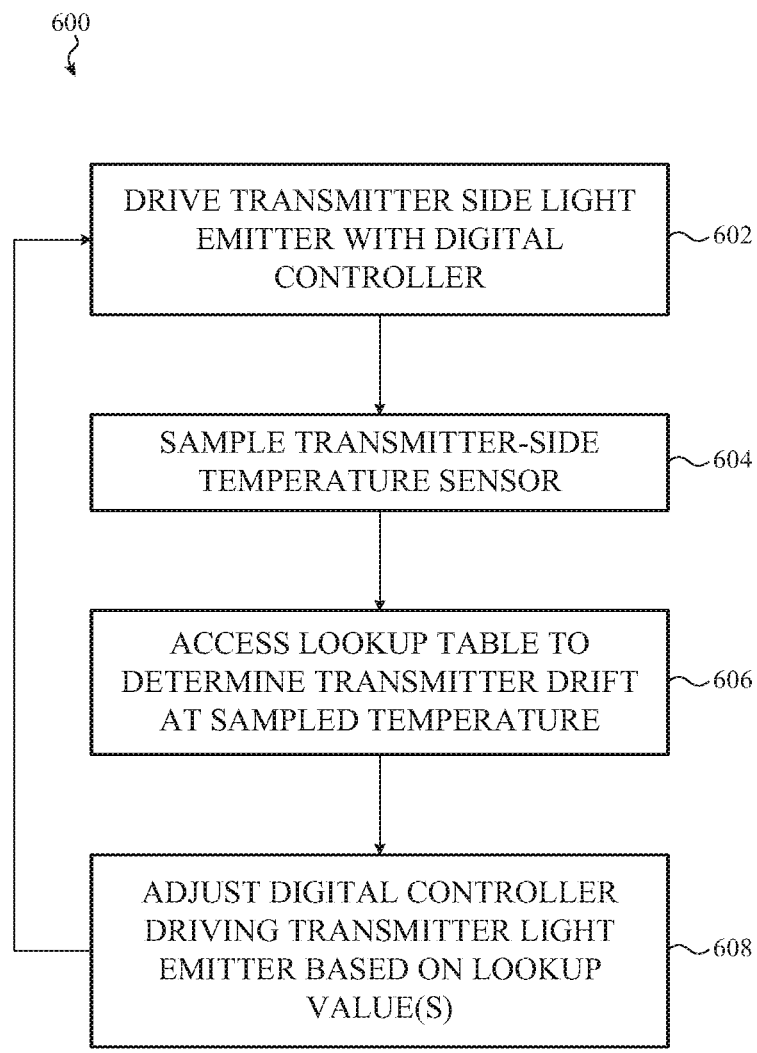
FIG. 6 is a flowchart depicting example operations of another method of operating an optical sensing system, such as described herein.

FIG. 6 is a flowchart depicting example operations of another method of operating an optical sensing system, such as described herein. The method 600 includes operation 602 in which a transmitter side light emitter is driven from an output of a digital-to-analog converter. Next, at operation 604, a transmitter side temperature sensor that is thermally coupled to the light emitter is sampled. The method 600 advances to operation 606 at which a lookup table is accessed to determine a transmitter drift based on the temperature sampled. The method 600 advances to operation 608 at which a value obtained from the lookup table query can be leveraged to adjust one or more outputs of the digital-to-analog controller driving the light emitter. Thereafter, the method 600 may return to operation 602 and continue. In this embodiment, a signal drift calibration operation is performed by leveraging output from a transmitter side temperature sensor.

Figure 7:
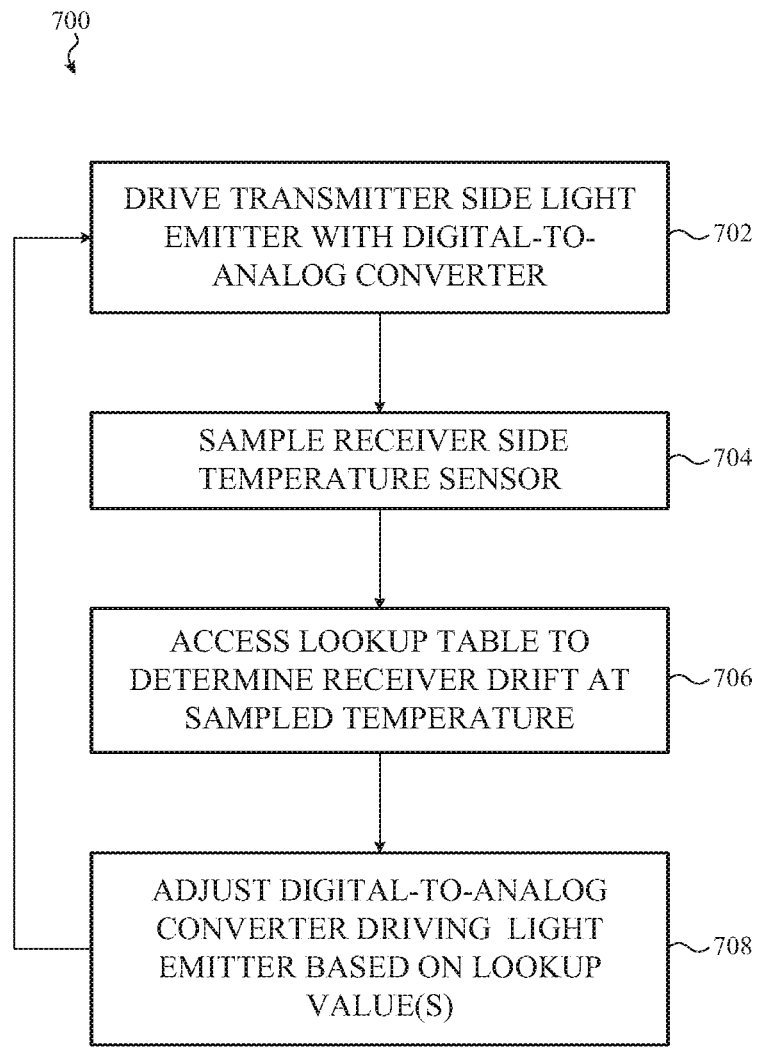
FIG. 7 is a flowchart depicting example operations of another method of operating an optical sensing system, such as described herein.

FIG. 7 is a flowchart depicting example operations of another method of operating an optical sensing system, such as described herein. The method 700 includes operation 702 in which a transmitter side light emitter is driven from an output of a digital-to-analog converter. Next, at operation 704, a receiver side temperature sensor is sampled. The method 700 advances to operation 706 at which a lookup table is accessed to determine a transmitter drift based on the temperature sampled. The method 700 advances to operation 708 at which a value obtained from the lookup table query can be leveraged to adjust one or more outputs of the digital-to-analog controller driving the light emitter. Thereafter, the method 700 may return to operation 702 and continue. In this embodiment, a signal drift calibration operation is performed by leveraging output from a receiver side temperature sensor. In many cases, a transmitter-side temperature sensor may be sampled at the same time and/or rate as a receiver-side temperature sensor.

Figure 8:
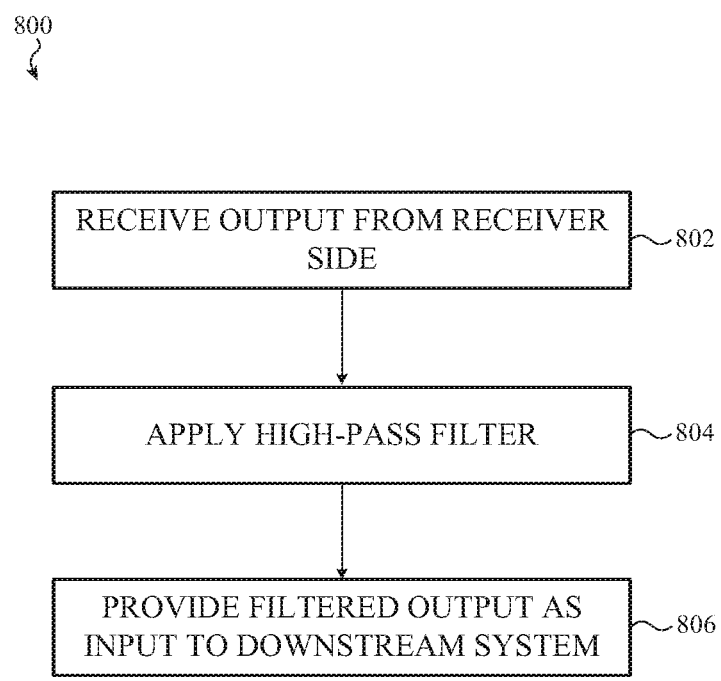
FIG. 8 is a flowchart depicting example operations of another method of operating an optical sensing system, such as described herein.

FIG. 8 is a flowchart depicting example operations of another method of operating an optical sensing system, such as described herein. The method 800 includes operation 802 at which an output from a receiver side of an optical sensing system is received. Next, at operation 804, a high-pass filter is applied. Bounds and/or central frequency of the high-pass filter may vary from embodiment to embodiment. The method 800 advances to operation 806 at which a filtered output of the receiver side of the optical sensing system is provided as input to a downstream system, such as an electronic device processor.

Figure 9:
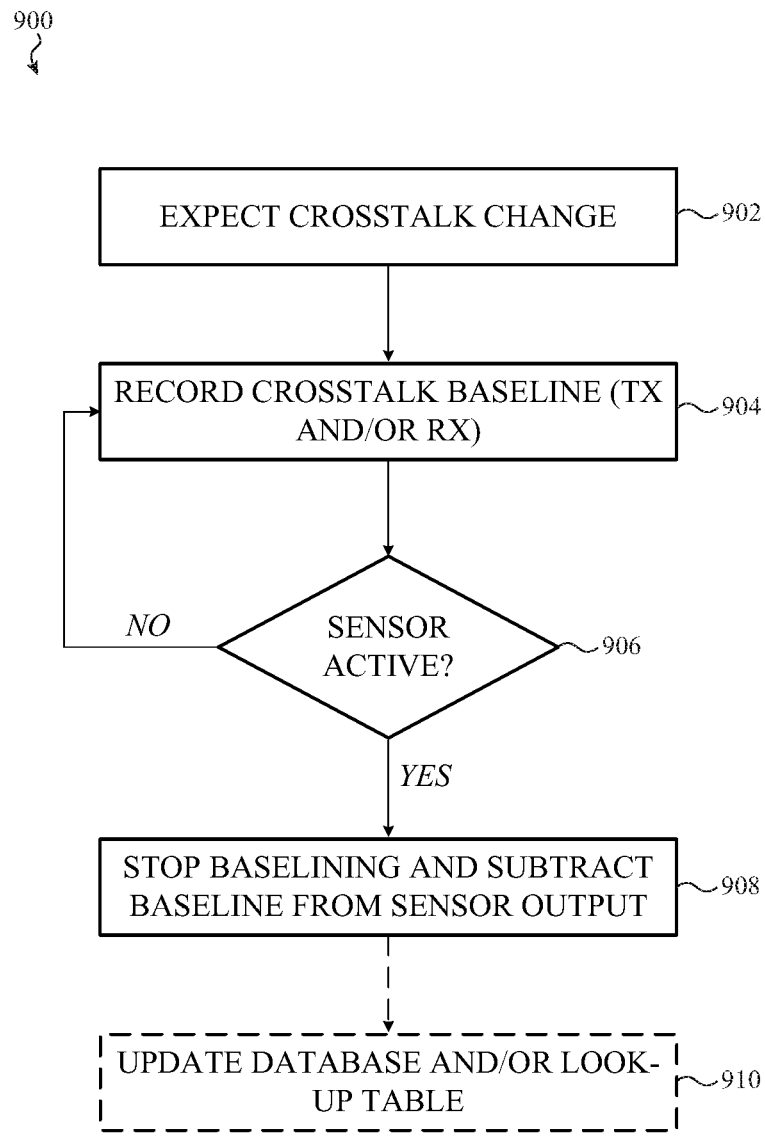
FIG. 9 is a flowchart depicting example operations of another method of operating an optical sensing system, such as described herein.

FIG. 9 is a flowchart depicting example operation of another method of operating an optical sensing system, such as described herein. The method 900 includes operation 902 at which an optical sensing system, and/or an electronic device incorporating the optical sensing system can determine or otherwise expect that a crosstalk condition has occurred. In other words, a sensing output or determination of the optical sensing system (and/or electronic device) determines that a change in crosstalk is likely to occur or, in other cases, is likely to have already occurred. For example, a change in temperature may signal that one or more crosstalk characteristics is likely to change and/or has changed. In other cases, movement of an electronic device (e.g., detected via an accelerometer, magnetometer, gyroscope, inertial measurement unit, and so on) can indicate or otherwise signal that one or more crosstalk characteristics is likely to change and/or has changed. In yet other cases, a touch screen or touch screen location adjacent to or near to an optical sensing system may have recently been touched by a user, resulting in a possibility that smudging or other oils or debris may be present and may cause a change in crosstalk.

Next, at operation 904, the optical sensing system can begin a crosstalk calibration operation, such as described above. The crosstalk calibration operation can involve operating a sensor or sensing system of a transmitter side or a receiver side of the optical sensing system. For example, one or more temperature sensors can be sampled (at the same time), one or more optical sensors may be sampled, and so on. Outputs from these various sensor sampling operations can be used to determine a baseline crosstalk magnitude that, in turn, can be subtracted from any signal received by the receiver side when the optical sensing system is in use. This calibration operation may continue in a loop, retriggering at an interval, constantly updating, or may be repeated in response to different triggers or stimulus.

Next, at operation 906, it may be determined whether the optical sensing system should be operated to detect whether an object is present within a field of view of the sensor. If the sensor should not be activated, the method 900 may return to operation 904 or, alternatively, the method 900 may terminate.

In other cases, it may be determined that the optical sensing system should be operated to detect whether an object is present within a field of view of the sensor. In this circumstance, the method 900 advances to operation 908 at which one or more values determined at operation 904 may be subtracted from one or more values obtained by a receive side of the optical sensing system. In this manner, and as a result of this construction, crosstalk effects can be effectively canceled from receive side output signals.

In some cases, optionally, the method 900 can advance to operation 910 at which one or more calibration databases, look-up tables, or other memory can be updated with the baseline value determined at operation 904.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented. For example, any stationary or portable electronic device can include an optical sensing system, such as described herein. Example electronic devices include, but are not limited to: mobile phone devices; tablet devices; laptop devices; desktop computers; computing accessories; peripheral input devices; home or business networking devices; aerial, marine, submarine, or terrestrial vehicle control devices or networking devices; mobile entertainment devices; augmented reality devices; virtual reality devices; industrial control devices; digital wallet devices; home or business security devices; wearable devices; health or medical devices; implantable devices; clothing-embedded devices; fashion accessory devices; home or industrial appliances; media appliances; and so on.

What is claimed is:

1. An electronic device comprising:
an optical transceiver system for detecting proximity of an object external to the electronic device, the optical transceiver system comprising:
  a light emitter configured to emit light toward the object;
  a first photosensor configured to receive light emitted from the light emitter;
  a second photosensor optically isolated from the first photosensor and the light emitter and configured to receive light emitted from the light emitter and reflected from the object;
  a first temperature sensor thermally coupled to the light emitter;
  a second temperature sensor thermally coupled to the second photosensor; and
  a processor configured to:
    apply a first field calibration by adjusting power output from the light emitter based on an output from the first photosensor;
    apply a second field calibration by adjusting power output of the second photosensor based on at least one sensor output of the first temperature sensor or the second temperature sensor; and
    apply a third field calibration of the optical transceiver system by filtering output of the second photosensor with a high-pass filter.

2. The electronic device of claim 1, comprising:
a housing defining an interior cavity; and
a display within the interior cavity; wherein
the optical transceiver system is positioned within the interior cavity adjacent to the display.

3. The electronic device of claim 2, wherein:
the display defines an active display area;
the optical transceiver system is positioned below the active display area; and
the light emitter is configured to emit light through the active display area.

4. The electronic device of claim 1, wherein the optical transceiver system comprises:
a module enclosure defining:
a first barrel enclosing the light emitter and the first photosensor; and
a second barrel enclosing the second photosensor and optically isolated from the first barrel.

5. The electronic device of claim 4, wherein the processor is enclosed, at least partially, by the module enclosure.

6. The electronic device of claim 4, wherein:
the first barrel encloses the first temperature sensor; and
the second barrel encloses the second temperature sensor.

7. The electronic device of claim 6, wherein:
the first barrel is capped by a first lens; and
the second barrel is capped by a second lens.

8. The electronic device of claim 1, further comprising:
a digital-to-analog converter configured to convert a first digital value into a first analog signal driving the light emitter; and
an analog-to-digital converter configured to convert a second analog signal output from the second photosensor into a second digital value.

9. The electronic device of claim 8, wherein:
the first field calibration comprises a first digital adjustment to the first digital value;
the second field calibration comprises a second digital adjustment to the second digital value; and
the third field calibration comprises a third digital adjustment to the second digital value.

10. The electronic device of claim 9, wherein the processor is configured to:
access a first lookup table to determine the first digital adjustment;
access a second lookup table to determine the second digital adjustment; and
access a third lookup table to determine the third digital adjustment.

11. The electronic device of claim 10, wherein:
the optical transceiver system comprises an application-specific integrated circuit comprising:
the processor; and
a memory operably coupled to the processor; and
the first lookup table, the second lookup table, and the third lookup table are stored in the memory of the application-specific integrated circuit.

12. The electronic device of claim 1, wherein the processor is configured to:
apply the first field calibration by adjusting real-time power output from the light emitter based on power output from the first photosensor; and
apply the second field calibration by adjusting real-time power output of the second photosensor based on sensor output of the first temperature sensor and the second temperature sensor.

13. The electronic device of claim 1, wherein:
the light emitter comprises a laser;
the first photosensor comprises a first photodiode; and
the second photosensor comprises a second photodiode.

14. The electronic device of claim 1, wherein the processor is configured to apply the first field calibration by adjusting power output from the light emitter based on a wavelength of light detected by the first photosensor.

15. An optical proximity sensor system for determining proximity of an object to an external surface of a portable electronic device, the optical proximity sensor system comprising:
an enclosure defining a transmitter-side barrel and a receiver-side barrel;
a transmitter module within the transmitter-side barrel and configured to receive a first digital value, the transmitter module comprising:
a digital-to-analog converter configured to receive the first digital value and to output a current in proportion to the first digital value;
a light-emitting element configured to receive the current and, in response, to emit light out of the transmitter-side barrel;
a photodetector module configured to receive light emitted from the light-emitting element and, in response, output a second digital value used to bias the first digital value to control:
power output from the light-emitting element;
wavelength output from the light-emitting element; or
bandwidth output from the light-emitting element; and
a temperature sensor thermally coupled to the light-emitting element and configured to output a temperature value used to bias the first digital value to control:
power output from the light-emitting element;
wavelength output from the light-emitting element; or
bandwidth output from the light-emitting element; and
a receiver module within the receiver-side barrel and configured to receive light reflected from the object and, in response, output a third digital value corresponding to proximity of the object to the external surface.

16. The optical proximity sensor system of claim 15, wherein:
the temperature sensor is a first temperature sensor;
the temperature value is a first temperature value; and
the receiver module comprises:
a photosensor configured to receive light reflected from the object;
an analog-to-digital converter operably coupled to the photosensor and configured to output the third digital value; and
a second temperature sensor thermally coupled to the photosensor and configured to output a second temperature value used to bias the third digital value.

17. The optical proximity sensor system of claim 15, wherein the receiver module comprises a high-pass filter applied to the third digital value.

18. The optical proximity sensor system of claim 15, wherein the temperature value is used to bias the first digital value by an amount selected from a lookup table.

19. A method of operating an optical proximity sensor system for a portable electronic device, the method comprising:
driving a light-emitting element with a current defined by a digital drive current value;
sampling a first temperature sensor thermally coupled to the light-emitting element to obtain a first temperature value;

biasing the digital drive current value based on the first temperature value;
sampling a first light sensor optically coupled to the light-emitting element to obtain a first light value;
biasing the digital drive current value based on the first light value;
sampling a second light sensor optically isolated from the light-emitting element to obtain a second light value;
sampling a second temperature sensor thermally coupled to the second light sensor to obtain a second temperature value;
biasing the second light value based on the second temperature value; and
providing, as output, the biased second light value.

20. The method of claim 19, further comprising:
querying a first lookup table with the first temperature value to obtain a first thermal calibration value;
biasing the digital drive current value based on the first thermal calibration value;
querying a second lookup table with the first light value to obtain a first light calibration value;
biasing the digital drive current value based on the first light calibration value;
querying a third lookup table with the second light value to obtain a second light calibration value;
one, or both, of:
  biasing the digital drive current value based on the second light calibration value; or
  biasing the second light value based on the second light calibration value;
querying a third lookup table with the second temperature value to obtain a second thermal calibration value; and
biasing the second light value based on the second light calibration value.

* * * * *